United States Patent
Suhara

(10) Patent No.: US 8,122,695 B2
(45) Date of Patent: Feb. 28, 2012

(54) LAWN MOWER GRASS COLLECTOR LIFT MECHANISM

(75) Inventor: Yasuyuki Suhara, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 494 days.

(21) Appl. No.: 12/308,730

(22) PCT Filed: Oct. 6, 2006

(86) PCT No.: PCT/JP2006/320086
§ 371 (c)(1),
(2), (4) Date: Dec. 22, 2008

(87) PCT Pub. No.: WO2008/012927
PCT Pub. Date: Jan. 31, 2008

(65) Prior Publication Data
US 2011/0197560 A1 Aug. 18, 2011

(30) Foreign Application Priority Data

Jul. 27, 2006 (JP) ................................ 2006-204748

(51) Int. Cl.
*A01D 43/00* (2006.01)
*A01D 43/06* (2006.01)
(52) U.S. Cl. ......................................................... 56/202
(58) Field of Classification Search .................... 56/202, 56/320.2, 203, 204
See application file for complete search history.

(56) References Cited

U.S. PATENT DOCUMENTS

| | | | |
|---|---|---|---|
| 3,744,653 A * | 7/1973 | Jensen ............................ | 414/471 |
| 4,523,788 A | 6/1985 | Prasad | |
| 6,050,072 A * | 4/2000 | Chabrier et al. ................ | 56/202 |
| 6,513,312 B1 | 2/2003 | Ishimori et al. | |
| 6,584,757 B2 * | 7/2003 | Komorida et al. ............... | 56/202 |
| 7,730,706 B2 * | 6/2010 | Ogata et al. ...................... | 56/203 |
| 2005/0109003 A1 | 5/2005 | Shibata et al. | |
| 2009/0282797 A1 * | 11/2009 | Ogata et al. ...................... | 56/202 |

FOREIGN PATENT DOCUMENTS

| | | | |
|---|---|---|---|
| EP | 876749 A1 * | 11/1998 | |
| JP | 5-284835 | 11/1993 | |
| JP | 9-009759 | 1/1997 | |
| JP | 9-047134 | 2/1997 | |
| JP | 2526266 | 2/1997 | |
| JP | 9-191745 | 7/1997 | |
| JP | 2002-084850 | 3/2002 | |
| JP | 2002-101722 | 4/2002 | |
| JP | 2002101722 A * | 4/2002 | |
| JP | 3628231 | 3/2005 | |
| JP | 2005-151840 | 6/2005 | |

* cited by examiner

*Primary Examiner* — Arpad Fabian-Kovacs

(74) *Attorney, Agent, or Firm* — Jordan and HamburgLLP

(57) ABSTRACT

A lawn mower is provided wherein mowed grass is discharged from a mower device into a grass collector, with turnover of a traveling body being prevented, with the grass in the grass collector deposited in a container. The lawn mower has a mower device mounted on a traveling body provided with right and left rear wheels, a grass collector for collecting the mowed grass, a discharge duct for discharging the mowed grass from the mower device to the grass collector, and a lift mechanism having right and left fixed masts for supporting the grass collector that is lifted up and down. The lift mechanism lifts the grass collector to discharge the mowed grass therein. The lift mechanism is disposed widthwise between the right and left grass collector sides. The discharge duct connects to the grass collector between the right and left fixed masts, and is disposed therebetween.

2 Claims, 20 Drawing Sheets

LAWN MOWER GRASS COLLECTOR LIFT MECHANISM

TECHNICAL FIELD

The present invention relates to a lawn mower comprising a mower device for mowing lawn grass uprightly planted on the ground, and a grass collector for collecting grass mowed by the mower device, and in particular, relates to a lawn mower equipped with a grass collector to be lifted up and down through a lift mechanism to a traveling body.

BACKGROUND ART

Conventionally, in general, a lawn mower comprises a mower device having a rotary mowing blade and attached to a traveling body to be lifted up and down, a discharge duct having a tubular shape and extending backward from the mower device, and a box-shaped grass collector communicating with the discharge duct, wherein the lawn mower continuously mows grass, etc. on the ground with the mower device, and the mowed grass such as the lawn grass is discharged to the grass collector through the discharge duct from the mower device.

In this case, the conventional lawn mowers have employed an arrangement, wherein the grass collector are supported at both sides thereof by right and left booms provided on a traveling body, when the grass collector becomes full of mowed grass, the grass collector is lifted above a container or a loading space of a truck, etc. by raising distal ends of the right and left booms with proximal ends thereof as fulcrums, and the mowed grass in the grass collector is discharged into the container or the loading space of the truck, etc. (for example, see Patent Document 1). Also, well-known to the person skilled in the art is an arrangement wherein right and left fixed masts are erected on a rear part of a running vehicle, and a grass collector is supported to the fixed masts to be lifted up and down, and the mowed grass in the grass collector is discharged into the container, etc. (for example, see Patent Document 2 or 3).
[Patent Document 1] JP 2002-84850 A
[Patent Document 2] JP 09-9759 A
[Patent Document 3] JP 09-47134 A

DISCLOSURE OF THE INVENTION

Problems to be solved by the Invention

By the way, in Patent Document 1, there is a problem that because the right and left booms and hydraulic cylinders which rotate the booms and lift up and down the grass collector are arranged in both outsides of the grass collector, the booms or the hydraulic cylinders and hydraulic piping thereof, etc. collide with growing trees, fallen trees or obstructions such as stones, etc. on the ground to be damaged. For example, there is a problem that even when a width of the grass collector is increased in the right and left directions thereof in order to increase the volume thereof, the booms or the hydraulic cylinders and hydraulic piping thereof, etc. are disposed in the outsides of the right and left traveling parts because a distance between the right and left traveling parts (such as rear wheels and traveling crawlers) cannot be increased. On the other hand, upward increase of the grass collector in order to increase the volume thereof allows the booms or the hydraulic cylinder and piping thereof, etc. to be disposed inside of the right and left traveling parts. However, this makes it difficult to discharge the mowed grass to an upper part of the grass collector, therefore inhibiting effective use of the volume of the grass collector for accommodation of the mowed grass.

Then, as described in Patent Document 2, masts are erected on a traveling body, a grass collector is supported by the masts, and thereby, a lift mechanism including the masts and the like can be disposed within a right and left width of the grass collector, the grass collector can be increased in the right and left directions and the volume thereof can be increased. However, it is necessary that a forced transfer mechanism such as a thrower for transferring mowed grass from a mower device to the grass collector is specially provided and is disposed outside of the traveling body. Accordingly, there are problems that the width of the traveling body in the right and left directions increases, and a structure from the mower device to the grass collector for discharging the mowed grass cannot be simply configured.

Moreover, in Patent Document 1, when the grass collector full of the mowed grass is lifted up, a moving trajectory of the grass collector due to rotation of the booms forms an arc. Therefore, a center of gravity of the traveling body moves not only upward and downward but also backward and forward, and the traveling body becomes unstable and is likely to overturn, so that the mowed grass cannot be easily discharged into the container or the loading space of the truck, etc. In particular, by ensuring a moving space of the grass collector necessary for rotation of the booms, a reverse traveling distance of the traveling body approaching the container, etc. cannot be shortened. Accordingly, there is a problem that the traveling body cannot be prevented easily from overturning in places where the traveling body easily overturns, such as on a soft ground or a sloping ground, when the mowed grass in the grass collector is discharged.

On the other hand, as described in Patent Document 3, by lifting a grass collector from a position of the rear of the traveling body for collecting grass, to a position for discharging mowed grass approximately vertical to and above the position for collecting the grass, a reverse traveling distance of the traveling body approaching the container, etc. can be shortened more than that described in Patent Document 1 in which the booms are rotated. However, there is a problem that the mowed grass on a certain side (inside of the container which is closer to the traveling body) tends to be discharged, and the mowed grass in the central part of the container, etc. cannot be discharged easily.

On the other hand, in Patent Document 1 or Patent Document 3, there is a problem that when the traveling body is in a stopped state with the parking brake thereof on, a misoperation of a PTO operation body by an operator, etc. may cause the mower device to be driven and to be damaged even on a paved road surface. There is a problem that even when the operator brakes the traveling parts and urgently stops the traveling body while driving the mower device to cut the grass, the mower device continues to be driven. There is a problem that even when the grass collector is supported at a position except a position for collecting the grass, the mower device is driven by an operation of the PTO operation body. There is a problem that during driving of the mower device, the grass collector may be lifted up and down by a lift up or lift down operation of the lift operation body. In other words, the misoperation by the operator leads to improper driving of the mower device and improper lifting up and down of the grass collector, making it impossible to improve drivability or operability of mowing grass operation for the operator.

In addition, in Patent Document 1, because the grass collector is supported at distal ends of the right and left booms which are rotated by right and left hydraulic lift cylinders, a high position of a fulcrum point of the right and left booms allows a lifting amount to be larger even using a short boom. However, when the grass collector is lowered in the position for collecting the grass, the overall height of the lawn mower cannot be lowered. Also, because the right and left booms and the right and left hydraulic lift cylinders are disposed at both sides of the grass collector, there is a problem that manufacturing costs of hydraulic related parts of the lift mechanism cannot be easily reduced. On the other hand, as described in Patent Document 2, in the case that the grass collector is hung through a wire rope from a winch at the upper end of the masts, the overall height of the body cannot be lowered enough when the grass collector is lifted down to the position for collecting the grass. Thus, there is a problem that the center of gravity of the traveling body during a collecting grass operation cannot be lowered enough.

Also, an embodiment of Patent Document 1 has a structure in which a cover is connected through a third arm of a fork end shape to a second arm fixed to the grass collector, the first arm is connected to the second arm and the cover; the cover is openably and closably connected to the grass collector, and cannot be easily removed from the grass collector. And, in Patent Document 2, the mowed grass in the grass collector falls backward and downward by a self weight by opening the cover to the grass collector while the grass collector is opened backward and downward in a constant posture. In other words, in the structure of Patent Document 1 or 2, there is a problem that the grass collector of which the cover is removed cannot be easily utilized for a dust collection operation for discharging pruned branches or dust.

An objective of the present invention is to provide a lawn mower capable of preventing damages caused by collision of a lift mechanism with obstacles such as trees or stones, increasing a right and left width of a grass collector to increase a volume thereof, easily discharging mowed grass from a mower device to the grass collector, preventing overturn of the traveling body simply, and in addition, discharging the mowed grass in the grass collector into a container, etc.

Means for Solving the Problems

In order to achieve the above described object, a lawn mower comprises a mower device mounted on a traveling body provided with right and left traveling parts, a grass collector for collecting mowed grass by the mower device, a discharge duct for discharging the mowed grass from the mower device into the grass collector, and a lift mechanism having right and left fixed masts for supporting the grass collector to the traveling body to be lifted up and down, the lift mechanism being configured to discharge the mowed grass in the grass collector after lifting up the grass collector by the lift mechanism, wherein the lift mechanism is disposed within a width in a right and left direction of the grass collector, the discharge duct is disposed between the right and left fixed masts, and the discharge duct and the grass collector are connected through between the right and left fixed masts.

As for an invention, the lawn mower comprises the lift mechanism including: right and left movable masts supported to the right and left fixed masts to be lifted up and down; a lift frame body disposed to the movable masts to be lifted up and down; and lift drive means for lifting up and down the lift frame body, wherein the lift drive means are disposed on a base frame connected to the right and left fixed masts on an upside of the discharge duct.

An invention described, in the lawn mower, is configured, wherein the lift drive means and the movable masts are coupled to a first double speed mechanism, the movable masts and the lift frame body are coupled to a second double speed mechanism, the movable masts are lifted up and down respect to the fixed masts by the lift drive mechanism, and thereby, the lift frame body and the grass collector are lifted up and down to the movable masts.

An invention, in the lawn mower, is configured, wherein mast supporting bodies of the right and left fixed masts are connected to a rear end of the body frame of the traveling body, and at the same time, bottom ends of the right and left fixed masts are connected to right and left axle frames of the traveling body for attaching the right and left traveling parts.

As for an invention, in the lawn mower, the lawn mower comprises a supporting leg body that approaches in a landing direction by upward movement of the grass collector to a position for discharging the mowed grass, and getting away toward the ground by downward movement of the grass collecting body to a position for collecting the grass, and a locking mechanism that locks the supporting leg body in a landing position by upward movement of the grass collecting body to the position for discharging the mowed grass of the grass collector, wherein the supporting leg body and the locking mechanism are disposed in the bottom ends of the right and left fixed masts.

An invention, in the lawn mower, is configured, wherein the locking mechanism is configured to lock the supporting leg body by further upward movement of the grass collector after the supporting leg body approaches in the landing direction by upward movement of the grass collector, and the supporting leg body is configured to get away from a landing surface by further downward movement of the grass collector after the locking mechanism gets away from the supporting leg body by downward movement of the grass collector.

As for an invention, in the lawn mower, the lawn mower comprises a grass collector supported to the traveling body through the lift drive means to be lifted up and down and rotatably supported to the traveling body through dump drive means, a braking operation body for operating to brake a traveling part of the traveling body, a lifting operation body for operating the lift drive means, and a rolling operation body for operating the dump drive means, wherein permission control means for detecting a braking operation of the braking operation body and permitting each operation of the lifting operation body and the rolling operation body is provided.

As for an invention, in the lawn mower, the lawn mower comprises a check control means in which one operation of the lifting operation body and rolling operation body restricts the other operation thereof.

As for an invention, in the lawn mower, the lawn mower comprises an engine stop mechanism for stopping an engine mounted on the traveling body, a PTO operation body for operating to drive or stop the mower device, a PTO detection means for detecting an operation of the PTO operation body in order to drive the mower device, and parking brake detecting means for detecting an operation of a parking brake to be on in order to keep the traveling parts of the traveling body in a braked state, wherein the engine stop mechanism is configured to be actuated by a driving operation of the mower device when operating the parking brake to be on.

As for an invention, in the lawn mower, the lawn mower comprises a hydraulic lift cylinder, as the lift drive means, having a piston rod that advances upward, wherein the lift cylinder is disposed between the right and left fixed masts, both ends of mast traction bodies are connected to the traveling body and movable masts, the masts traction bodies are stretched through tip guide pulleys disposed at a tip end of the piston rod, both ends of lift traction bodies are connected to the traveling body and a lift frame body, the lift traction bodies are stretched through movable guide pulleys disposed at top ends of the movable masts.

As for an invention, in the lawn mower, the grass collector comprises a grass collection main body disposed to the lift mechanism, a cover openably and closably disposed on a rear face side of the grass collector, wherein a bottom rear end of the grass collector is connected to a rear end of the lift frame body projecting backward from the movable masts by a dump fulcrum shaft, the grass collection main body is configured to rotate backward around the dump fulcrum shaft, and at the same time, a top front end of the cover is connected to a top rear end of the grass collector through a pin-structured opening/closing fulcrum shaft capable of being attached and removed by one-touch operation, the cover is configured to rotate backward and upward around the opening/closing fulcrum shaft, and the cover is configured capable of being separated from the grass collection main body by removing the fulcrum shaft from the grass collection main body connected to the cover.

Effect of the Invention

According to the invention, a lawn mower comprises a mower device mounted on a traveling body provided with right and left traveling parts, a grass collector for collecting mowed grass by the mower device, a discharge duct for discharging the mowed grass from the mower device into the grass collector, and a lift mechanism having right and left fixed masts to support the grass collector to the traveling body to be lifted up and down, the lift mechanism being configured to lift up the grass collector and discharge the mowed grass in the grass collector, wherein the lift mechanism is disposed within a width of right and left directions of the grass collector, the discharge duct is disposed between the right and left fixed masts, and the discharge duct and the grass collector are connected through between the right and left fixed masts. Therefore, the lift mechanism can be disposed in the width in the right and left directions of the right and left traveling parts, and the lift mechanism is prevented from colliding with growing trees, fallen trees or obstructions such as stones on the ground and being damaged. And the right and left width of the grass collector can be increased, and the volume thereof can be increased. Also, the grass collector can be connected to the mower device by the discharge duct which is extended approximately linearly between the right and left fixed masts, in the other words, in a vicinity of approximately a center of the right and left width of the traveling body. Accordingly, in comparison with the conventional structure in which a transport mechanism to discharge the mowed grass from the mower device to the grass collector is specifically provided in an outside of the traveling body, the width in the right and left directions of the traveling body can be reduced, and the mowed grass can be discharged from the mower device into the grass collector with a simple transport structure.

According to the invention, the lift mechanism comprises right and left movable masts supported to the right and left fixed masts to be lifted up and down, a lift frame body disposed to the movable masts to be lifted up and down, and lift drive means for lifting up or down the lift frame body, wherein the lift drive means disposed on a base frame connected to the right and left fixed masts above the discharge duct. Therefore, as supporting means of the right and left fixed masts and as supporting means of the lift drive means, the base frame can be commonly used, and an assembling structure of the right and left fixed mast and the lift drive means can be simply configured. Also, by the right and left fixed masts and the base frame, both right and left sides and a top side of the discharge duct can be enclosed, and the discharge duct and the grass collector can be simply connected.

According to the invention, the lift drive means and the movable masts are connected by a first double speed mechanism, the movable masts and the lift frame body are connected by a second double speed mechanism, the movable masts are lifted up and down to the fixed masts by the lift drive mechanism, and thereby, the lift frame body and the grass collector are lifted up and down to the movable masts. Therefore, a lifting and lowering stroke of the movable masts can be easily made twice as much as that of the lift drive means, and a lifting and lowering stroke of the lift frame can be easily made twice as much as that of the movable masts. That is to say, a height of the fixed masts and a height of the movable masts can be lower not to block visibility of an operator (backward visibility of the traveling body). Also, because a lifting and lowering stroke (lifting amount) of the grass collector (lift frame body) can be easily made four times as much as that of the lift drive means, the lift drive means are simply configured by, for example, an inexpensive short-stroke lightweight hydraulic cylinder.

According to the invention, mast supporting bodies of the right and left fixed masts are connected to the rear end of the body frame of the traveling body, and at the same time, the bottom ends of the right and left fixed masts are connected to right and left axle frames, of the traveling body, for attaching the right and left traveling parts to. Therefore, by the right and left fixed masts, connection strength of the body frames and the right and left axle frames can be improved. Also, by the right and left axle frames, connection strength of the body frames and the right and left fixed masts can be improved. That is to say, the right and left rear wheels and the grass collection box can be supported with high rigidity.

According to the invention, a lawn mower comprises a supporting leg body that approaches to a landing position by upward movement of the grass collector toward a position for discharging mowed grass, and getting away toward the ground by downward movement of the grass collector toward a position for collecting grass, and a locking mechanism that locks the supporting leg body to the landing position by upward movement of the grass collector to the position for discharging the mowed grass of the grass collector, wherein the supporting leg body and the locking mechanism are disposed in the bottom ends of the right and left fixed masts. Therefore, by use of the right and left fixed masts, the supporting leg body can be supported in a vicinity of a travel road surface. That is to say, a structure to prevent turnover of a traveling body can be simply configured with the supporting leg body and the locking mechanism.

According to the invention, the locking mechanism is configured to lock the supporting leg body by further upward movement of the grass collector after the supporting leg body approaches in a landing direction by upward movement of the grass collector. Therefore, while the supporting leg body changes from a retracting posture, apart from a landing surface, to a landing position, the supporting leg body can be prevented from being locked by the locking mechanism. Accordingly, the supporting leg body is certainly locked in the landing posture by the locking mechanism, and the grass collector can be lifted up. Also, the supporting leg body is configured to get away from the landing surface by further downward movement of the grass collector after the locking mechanism gets away from the supporting leg body by downward movement of the grass collector. Therefore, until unlocking the supporting leg body in the landing posture, the supporting leg body cannot be retracted to get away from the landing surface by downward operation of the grass collector.

Accordingly, the supporting leg body retracted by downward operation of the grass collector can be prevented from being damaged. Also, an operator can be prevented from forgetting unlocking the grass collector, and a mowing operation for the lawn grass, etc. can be resumed after the supporting leg body is certainly returned to the retracting posture where the supporting leg body is away from the landing surface.

According to the invention, a lawn mower comprises a grass collector supported to the traveling body through the lift drive means to be lifted up and down and rotatably supported to the traveling body through dump drive means, a braking operation body for operating to brake a traveling part of the traveling body, a lifting operation body for operating the lift drive means, and a rolling operation body for operating the dump drive means, wherein permission control means for detecting a braking operation of the braking operation body and permitting each operation of the lifting operation body and the rolling operation body is provided. Therefore, in a state that an operator forcibly brakes the traveling part, lift drive means or dump drive means each can be operated, misoperation of the lifting operation body or the rolling operation body can be reduced, and the mowed grass in the grass collector can be simply prevented from being discharged at unexpected places.

According to the invention according, a lawn mower comprises check control means in which one operation of the lifting operation body and rolling operation body restricts the other operation thereof. Therefore, in a state that an operator forcibly brakes the traveling part, a lifting operation of the grass collector or rolling operation of the grass collector can be selectively performed. That is to say, in a state that the traveling body is certainly stopped, according to an initial procedure, an operation of discharging the mowed grass in the grass collector is performed, and overturn of the lawn mower can be easily prevented. Accordingly, the lawn mower with a lighter weight can provide reduction in manufacturing costs, and increase in volume of the grass collector can improve operability in mowing the grass, etc.

According to the invention, a lawn mower comprises an engine stop mechanism for stopping an engine mounted on the traveling body, a PTO operation body for operating to drive or stop the mower device, PTO detection means for detecting an operation of the PTO operation body in order to drive the mower device, and parking brake detecting means for detecting an operation of parking brake to be on in order to keep the traveling parts of the traveling body in a braked state, wherein the engine stop mechanism is configured to operate by a driving operation of the mower device during an operation of the parking brake to be on. Therefore, the engine can be stopped by misoperation of the PTO operation body, improper driving of the mower device due to misoperation by an operator can be easily prevented, and drivability or operability of mowing operation for the operator can be improved.

According to the invention, a lawn mower comprises a hydraulic lift cylinder, as the lift drive means, having a piston rod that advances upward, wherein the lift cylinder is disposed between the right and left fixed masts, both ends of mast traction bodies are connected to the traveling body and movable masts, the masts traction bodies are stretched through tip guide pulleys disposed at a tip end of the piston rod, both ends of lift traction bodies are connected to the traveling body and a lift frame body, the lift traction bodies are stretched through movable guide pulleys disposed at top ends of the movable masts. Therefore, the lift frame body can be lifted up toward an upper end of the movable mast projecting from an upper end of the fixed mast, and when the mowed grass is discharged, the grass collector can be lifted up to a extremely high position. On the other hand, the movable mast and the lift frame body can be lifted down within a height range of the fixed mast, and during the mowing operation in a state that the grass collector is lowered, the overall body height can be lowered. Also, a hydraulic pressure structure of the lift mechanism for lifting up and down the grass collector can be simply configured owing to provision of a single hydraulic lift cylinder.

According to the invention, the grass collector comprises a grass collection main body disposed in the lift mechanism, and a cover openably and closably disposed on a rear face side of the grass collector, wherein a bottom rear end of the grass collector is connected to a rear end of the lift frame body projecting backward from the movable masts by a dump fulcrum shaft, the grass collection main body is configured to rotate backward around the dump fulcrum shaft, and at the same time, a top front end of the cover is connected to a top rear end of the grass collector through a pin-structured opening/closing fulcrum shaft capable of being attached and removed by one-touch operation, the cover is configured to rotate backward and upward around the opening/closing fulcrum shaft, and the cover is configured capable of being separated from the grass collection main body by removal of the fulcrum shaft from the grass collection main body connected to the cover. Therefore, only by removing the opening/closing fulcrum shaft from the grass collection main body, without any tools, the cover can be simply separated from the grass collection main body. For example, the grass collection main body separated from the cover can be simply used for a dust collection operation, etc. for discharging branches of trees and duct, etc into containers.

Figure 1:
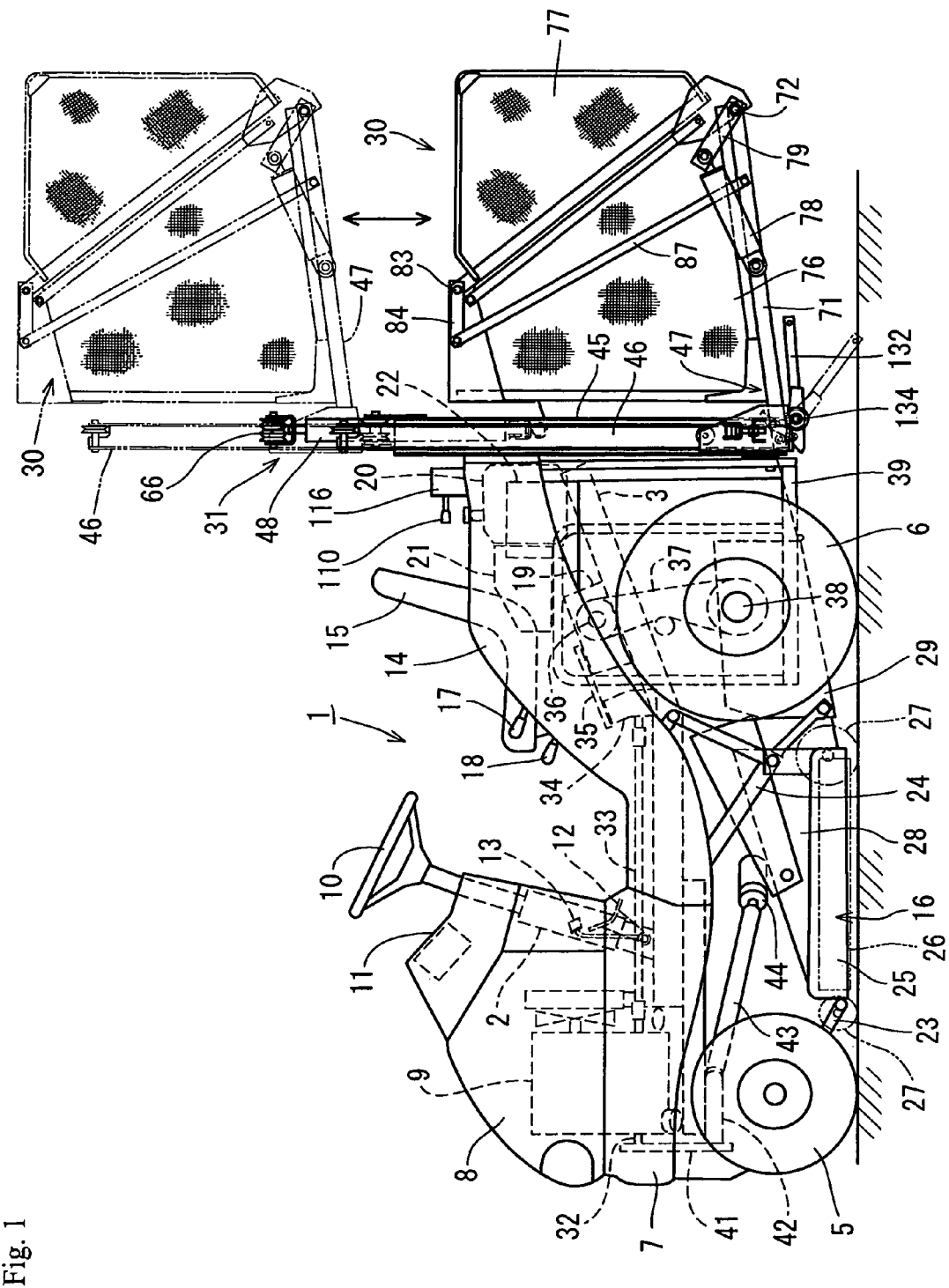
FIG. 1 is an overall side view showing a lawn mower.

BRIEF DESCRIPTION OF NUMERALS 1 traveling body
6 rear wheel (traveling part)
9 engine
13 brake pedal (braking operation body)
16 mower device
18 PTO clutch lever (PTO operation body)
29 discharge duct
30 grass collection box (grass collector)
31 lift mechanism
axle frame
45 fixed mast
46 movable mast
47 lift frame body
48 lift cylinder (lift drive means) (first double speed mechanism)
50 base flame
55 piston rod
58 lift wire (mast traction body)
59 lift wire (mast traction body)
66 triple pulley (tip guide pulley) (first double speed mechanism)
72 dump fulcrum shaft
74 lift-up wire (lift traction body) (second double speed mechanism)
75 lift-up pulley (movable guide pulley) (second double speed mechanism)
76 grass collection main body
77 cover
78 dump cylinder (damp drive means)
83 opening/closing fulcrum shaft
89 mowed grass
110 lift lever (lifting operation body)
111 dump lever (rolling operation body)
120 locking arm body (permission control means)
121 check arm body (check control means)
132 supporting leg body
137 outrigger locking mechanism
150 PTO clutch engagement sensor (PTO detection means)
151 engine stop solenoid (engine stop mechanism)
153 parking lever (parking brake)
154 parking brake sensor (parking brake detecting means)

Figure 2:
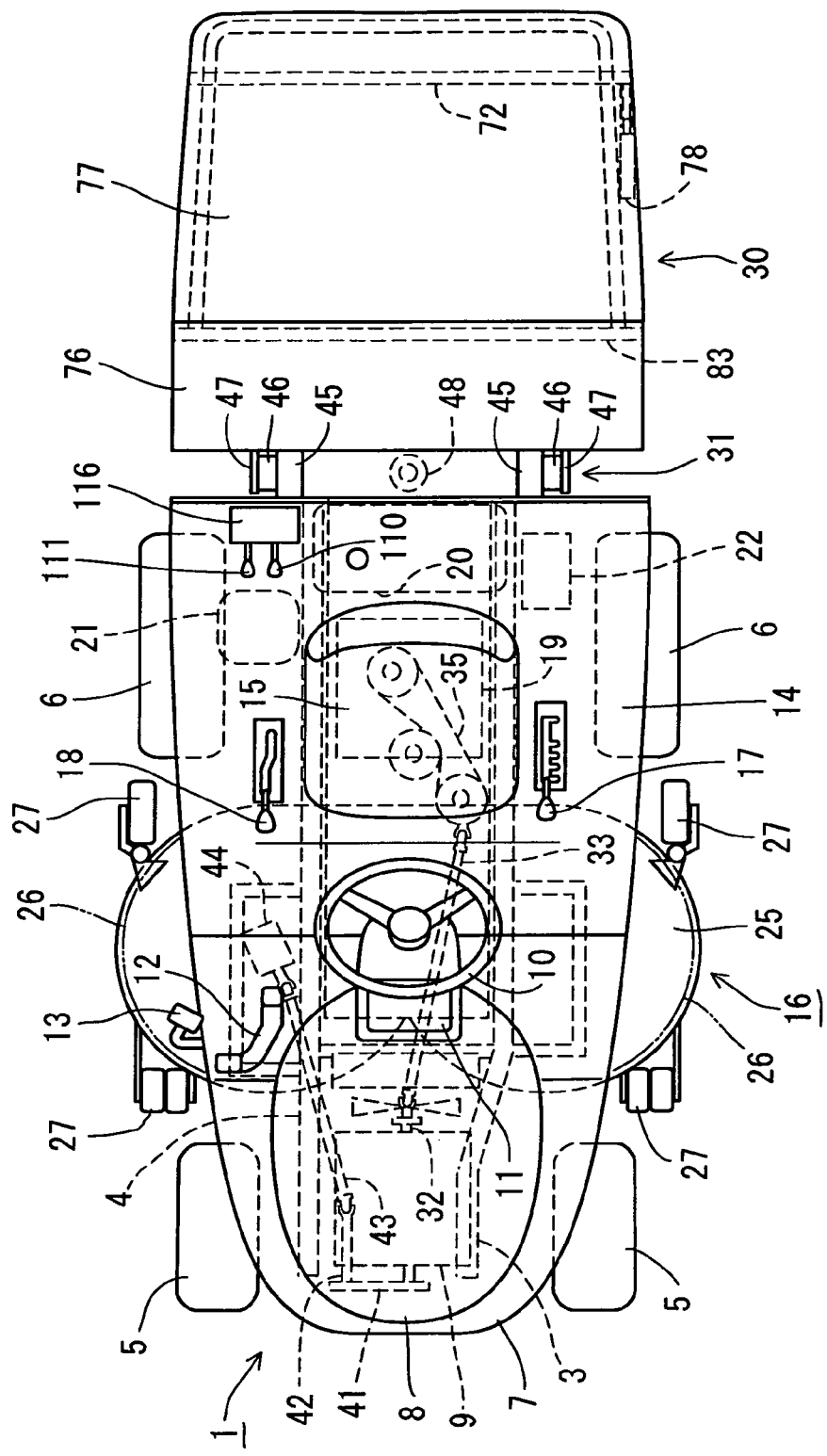
FIG. 2 is a plan view of FIG. 1.
Figure 3:
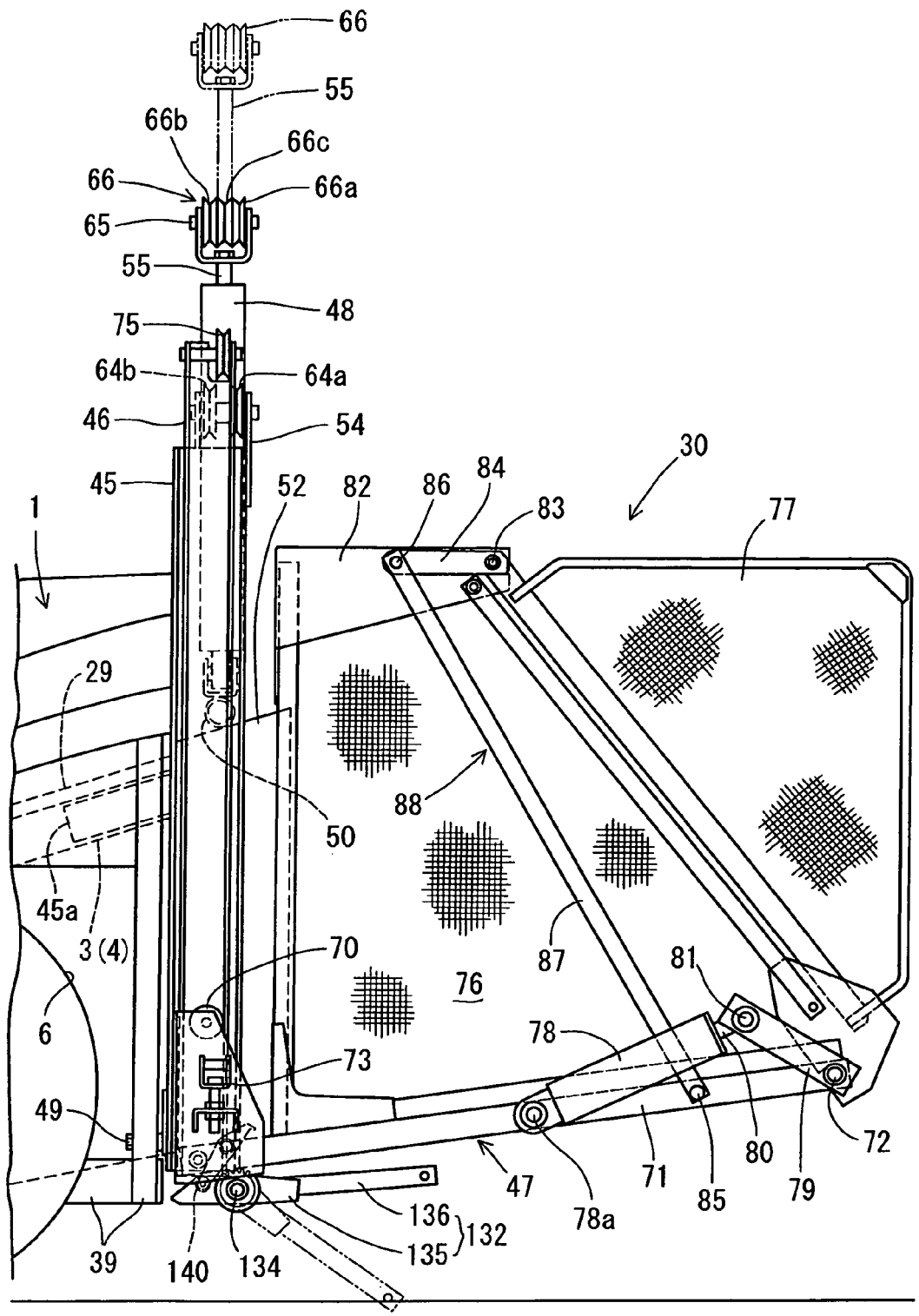
FIG. 3 is a side view showing a rear part of a traveling body and a grass collector.
Figure 4:
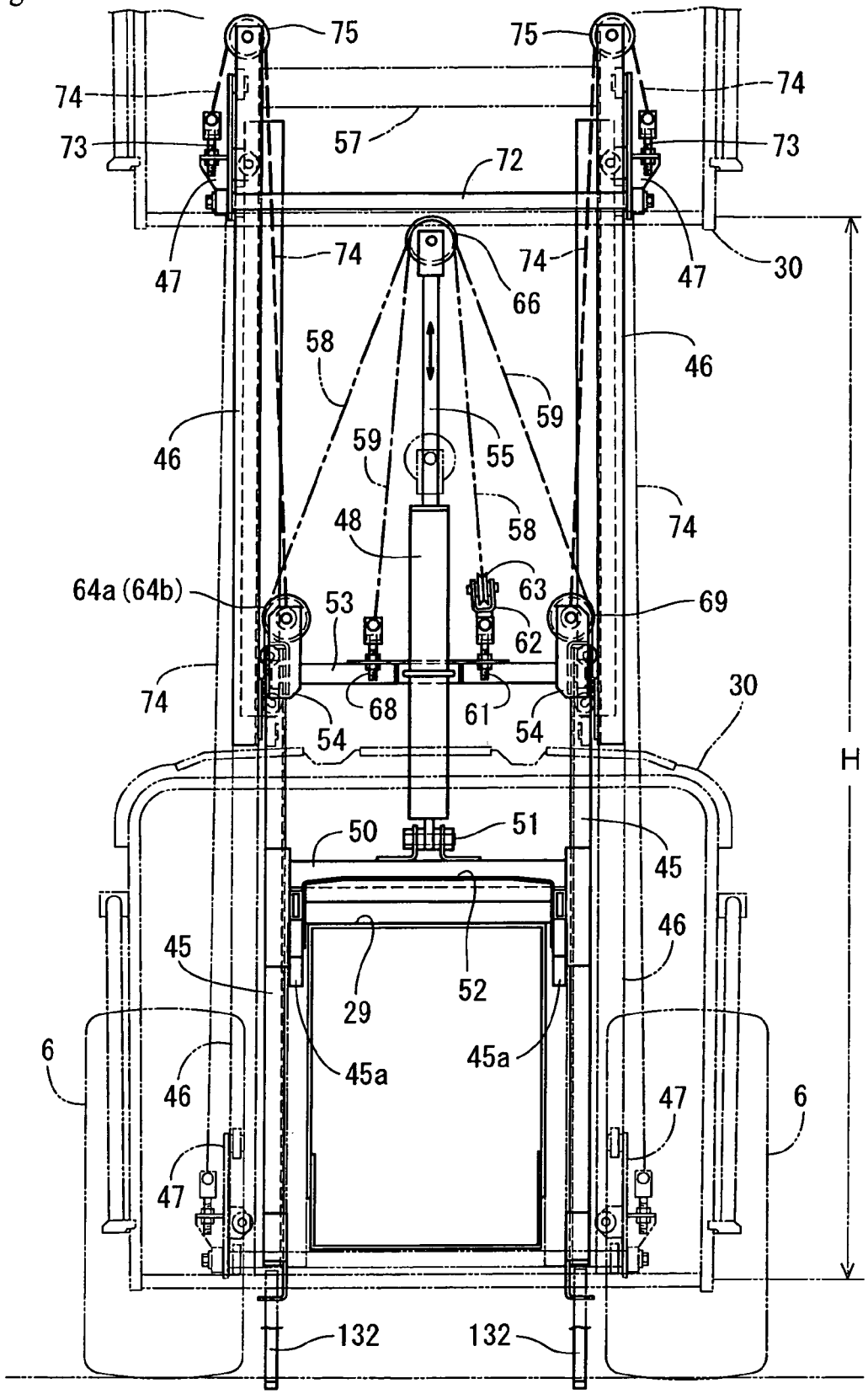
FIG. 4 is a rear view showing a lift mechanism.
Figure 5:
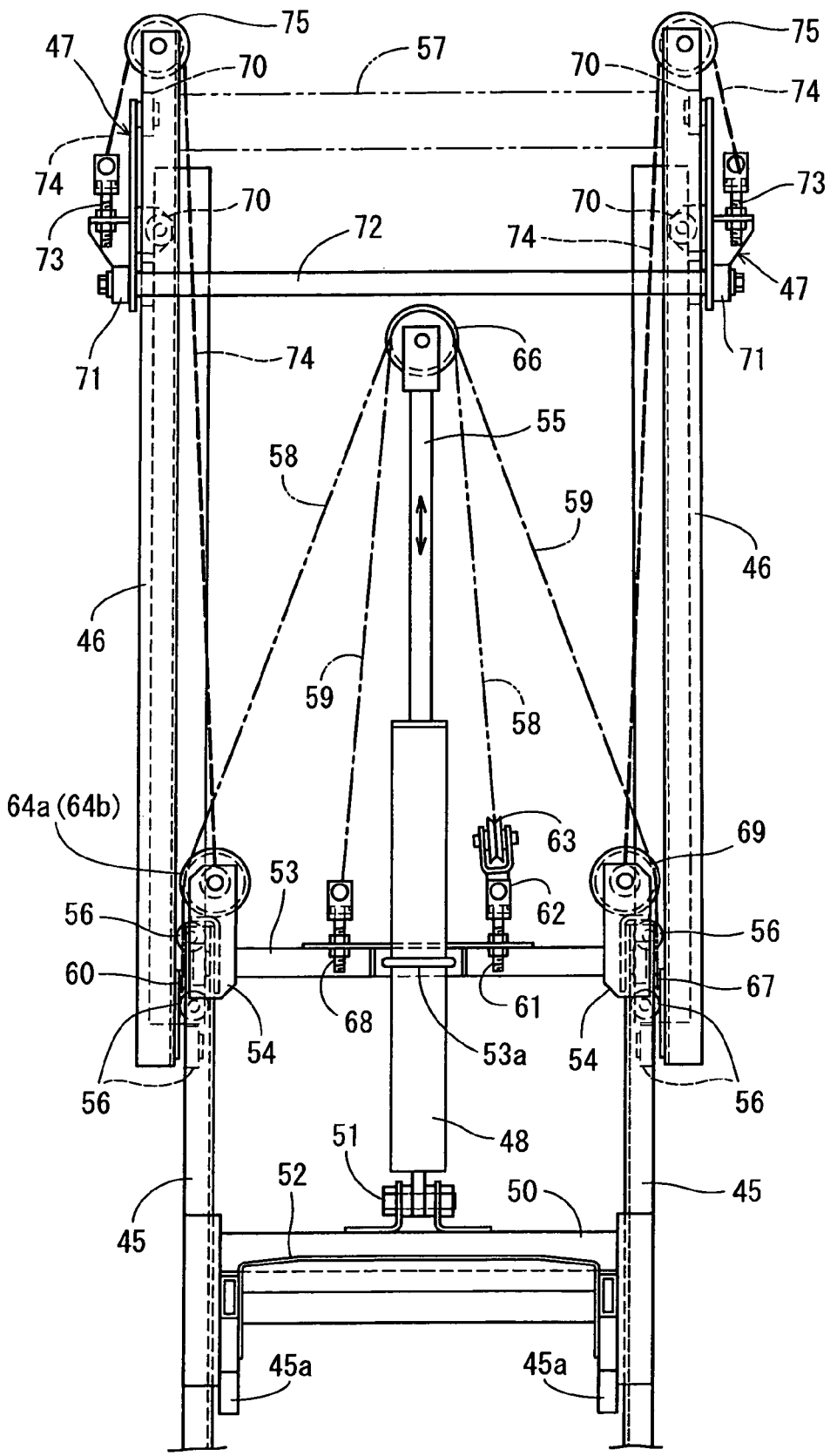
FIG. 5 is an enlarged view partially showing the lift mechanism of FIG. 4.
Figure 6:
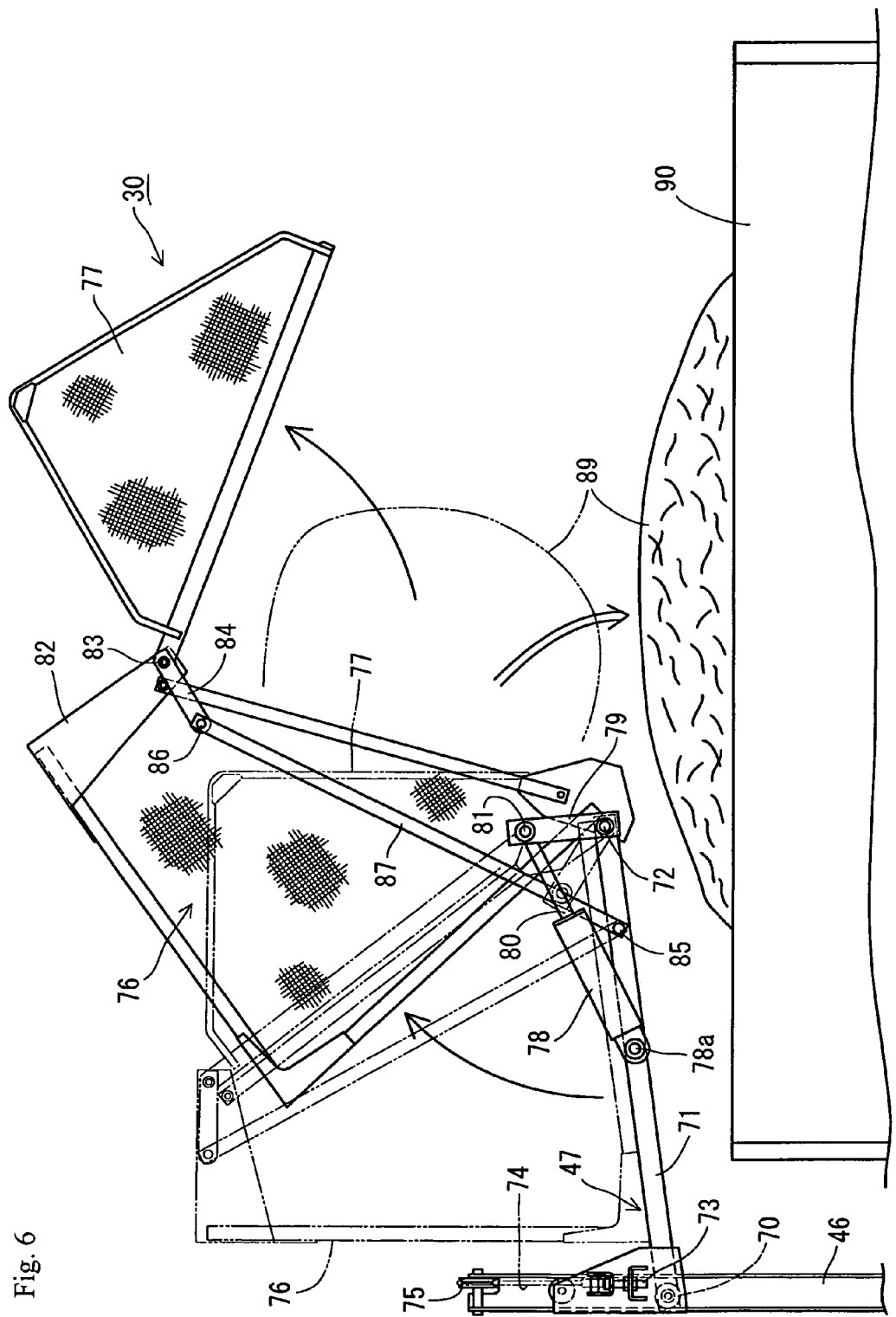
FIG. 6 is a side view showing a discharging state of mowed grass from the grass collector.
Figure 7:
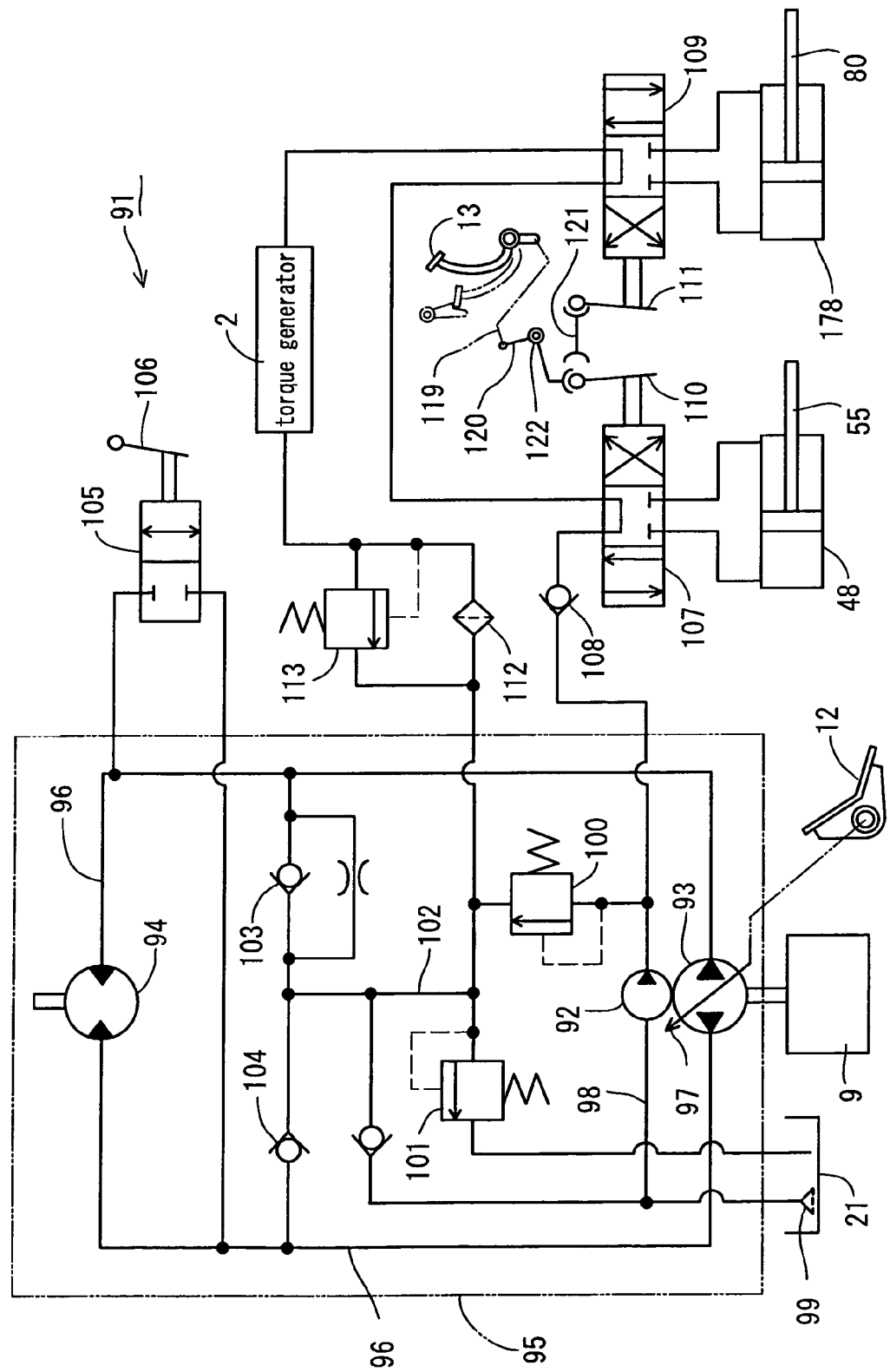
FIG. 7 is a hydraulic circuit diagram.

Preferred embodiments of the present invention are described below with reference to the accompanying drawings. FIG. 1 is a side view showing a lawn mower, FIG. 2 is a plan view of the lawn mower, FIG. 3 is a side view showing the rear of a traveling body and a grass collector, FIG. 4 is a rear view showing a lift mechanism, FIG. 5 is an partially enlarged view showing the lift mechanism of FIG. 4, FIG. 6 is a side view showing a discharging state of mowed grass from the grass collector, and FIG. 7 is a hydraulic circuit diagram. As shown in FIG. 1 and FIG. 2, in the lawn mower of the embodiment, a traveling body 1 includes right and left body frames 3,4 connected integrally with each other through a plurality of lateral frames (not shown). The body frames 3,4 are supported by right and left front wheels 5 and right and left rear wheels 6, which are disposed in the front and rear of both right and left sides of the body frame.

The front upper surface of the traveling body 1 is covered with a front cover 7. An engine 9 as a power source is covered by a hood 8 located on the front cover 7. A steering column 11 with a round shaped steering wheel 10 is mounted on the rear of the hood 8. A speed change pedal 12 for adjusting the speed of the vehicle (running speed of the traveling body 1) and a brake pedal 13 for braking the traveling body 1 (rear wheels 6) are disposed on the front cover 7 (on a step) in the right of the steering column part 11 in the driving direction.

The rear upper surface of the traveling body 1 is covered with a rear cover 14. A driver seat 15 is provided on the rear cover 14. When an operator on the driver seat 15 rotates the steering wheel 10 and a hydraulic torque generator 2 for power steering is operated according to the rotating amount (rotation angle) of the steering wheel 10, the steering angle (operating angle) of the right and left front wheels 5 is varied. At the left of the driver seat 15, a mower lift lever 17 is provided for forward and backward rotation. A mower device 16 for mowing lawn grass described below is lifted up and down by the mower lift lever 17. At the right of the driver seat 15, a PTO clutch lever 18 is provided for forward and backward rotation. The mower device 16 is started and stopped by the PTO clutch lever 18.

A transmission case 19 is disposed in the rear cover 14. The transmission case 19 includes a continuously variable, hydrostatic transmission 95 (HST type) described below. The transmission case 19 is disposed in the rear part of the body frames 3,4 (the part inclined downwardly from back to front). The transmission case 19 is configured to transfer power from the engine 9 to the right and left rear wheels 6 after changing the speed. A fuel tank 20 is mounted on the rear ends of the body frames 3,4. Fuel is supplied from the fuel tank 20 to the engine 9. An oil tank 21 is mounted outside the inclined portion of the right body frame 4. Hydraulic fluid will be supplied from the oil tank 21 to the continuously variable, hydrostatic transmission 95 etc. in the transmission case 19. A battery 22 for the engine 9 is mounted outside the inclined portion of the left body frame 3. The fuel tank 20 is disposed between the oil tank 21 and the battery 22.

On the bottom end of body frame 3,4, the mower device 16 is mounted for lifting up and down through link mallets 23, 24. The mower device 16 is disposed between the right and left front wheels 5 and the right and left rear wheels 6. The mower device 16 includes a bowl-shaped mower case 25 opening downward, and a right and left pair of rotary mowing blades 26 enabling horizontal rotation. The rotary mowing blades 26 are disposed in the mower case 25. Also, four gauge wheels 27 are attached to front and back of the right and left sides in the front and back of the mower case 25. A height of the mower device 16 to the ground during mowing (i.e., lowered position of the mower device 16) will be regulated by the gauge wheels 27. A duct part 28 is provided on the top of the mower case 25. The duct part 28 opens backward.

The duct part 28 is communicated with a front side of the discharge duct 29. The discharge duct 29 is disposed between right and left rear wheels 6 in the bottom side of the body frame 3,4. Also, a grass collection box 30 as a grass collector is communicated with the rear side of the discharge duct 29. The grass collection box 30 is made of mesh sheet formed in a cubic shape. The grass collection box 30 is liftably supported on the rear side of the traveling body 1 (through the lift mechanism 31). When grass such as lawn grass is mowed by the rotary mowing blades 26 in the mower case 25, the mowed grass is transported to the grass collection box 30 through the discharge duct 29 from the duct part 28 by the wind generated by the rotary mowing blade 26. The grass mowed by the mower device 16 is collected in the grass collection box 30. The lift mechanism 31 is disposed in the rear part of the traveling body 1.

Next, referring to FIG. 1 and FIG. 2, a powertrain system of the lawn mower will be described below. In the lawn mower of the embodiment, a two-wheel drive system, in which part of rotational power of the engine 9 is distributed into both the right and left rear wheels 6, is adopted. That is to say, the lawn mower includes an output shaft 32 longitudinally projecting from the engine 9, a propeller shaft 33 with the universal joint at both the front and rear ends, and a transmission relay case for traveling 34 disposed more forwardly than the transmission case 19. The part of the rotary power of the engine 9 will be transmitted from the rear end of the output shaft 32 to the transmission case 19 through the propeller shaft 33, the transmission relay case for traveling 34, and an endless input belt 35. The rotary power converted by the transmission case 19 is transmitted from the right and left rear wheel drive shafts 36 to right and left axles 38 through right and left endless rear wheel drive chains 37. As a result, the right and left rear wheels 6 fixed to the right and left axles 38 is rotationally driven. From the transmission case 19, horizontal right and left rear wheel drive shafts 36 are projected laterally. The right and left axle 38 is provided in the backside part of the traveling body 1. Right and left axle frames 39 are provided in the backside part of the right and left body frame 3,4 respectively, the right and left axles 38 are disposed in the right and left axle flames 39. The discharge duct 29 described above is extended between the right and left axle flames 39 in the front back direction.

As shown in FIG. 1, the discharge duct 29 for transporting mowed grass (mowed lawn grass) is extended between the mower device 16 (mowing grass part) in the bottom side of the traveling body 1 and the grass collection box 30 in the backside of the traveling body 1. The transmission case 19 is supported on the part of the traveling body 1 inclined downwardly from back to front above the discharge duct 29 in such a way that the transmission case 19 is inclined downwardly from back to front. The lift mechanism 31 is disposed in the traveling body 1 more backwardly than the transmission case 19 through an axle frame 39. Accordingly, a cross-section area (dimensions of height and width) for ventilation of the discharge duct 29 can be formed in a predetermined size so that the clog of mowed grass in the discharge duct 29 can be prevented. In addition, by using a simple assembly structure, the lift mechanism 31 can be supported to the traveling body 1 through the axle frame 39 with high rigidity.

On the other hand, the other rotary power of the engine 9 is transmitted from the front end of output shaft 32 to a PTO shaft 42 through an endless PTO transmission belt 41 for PTO power transmission. The PTO shaft 42 is supported in the front part of the body frame 4. Subsequently, the power is transmitted from the PTO shaft 42 to a gearbox 44 for a mower through countershaft 43 with universal joints at both the front and back ends. As a result, a left rotary mowing blade 26 in the mower case 25 is driven clockwise in a plan view. A right rotary mowing blade 26 is driven counter clockwise in a plan view. While mowing lawn grass etc. is mowed with the right and left rotary mowing blades 26, the mowed grass is collected in the center of the right and left width of the mower case 25 and is discharged from the duct part 28 to the discharge duct 29. The gearbox 44 for a mower is disposed on the mower case 25 in a more rightwardly than the body frame 4.

In the configuration described above, the power of the engine 9 is transmitted to the transmission case 19 with a single propeller shaft 33. Also, while maintaining the cross-section area (dimensions of height and width) for ventilation of the discharge duct 29 in a predetermined size and placing the transmission case 19 in the higher portion of the traveling body 1, the propeller shaft 33 can be lowered by the vertical transmission dimension of the transmission relay case 34. Accordingly, even if the propeller shaft 33 is disposed below the step (front cover 7) between the engine 9 and the transmission case 19, a step for the operator on the driver seat 15 to put his/her feet can be formed in a lower position. That is to say, there is an advantage that the followings are achieved simultaneously: simple configuration of the powertrain mechanism to the transmission case 19, smooth discharge of mowed grass with an arrangement of a large discharge duct 29 in the center of the right and left width of the traveling body 1, and simple getting on and off of the operator to the driver seat 15.

Next, referring to FIGS. 3 to 5, the structure of the lift mechanism 31 is described below. As shown in FIG. 3 and FIG. 4, the lift mechanism 31 comprises parallel right and left fixed masts 45 erected at the rear of the traveling body 1, parallel right and left movable masts 46 supported to be lifted up and down to the right and left fixed masts 45, lift frame bodies 47 supported to be lifted up and down to the right and left movable masts 46 and a single hydraulic lift cylinder 48 lifting up and down the movable masts 46 and the lift frame bodies 47.

As shown in FIGS. 3 to 5, mast supporting bodies 45a with a square pipe shape are provided in front of the right and left fixed masts 45. By inserting the mast supporting bodies 45a into inner holes of body frame 3,4 with a square pipe shape from the rear end, the right and left fixed masts 45 are supported by the right and left body frame 3,4. Also, the bottom ends of the right and left fixed masts 45 are fastened to the rear ends of the right and left axle frames 39 with bolts 49. The mounting width between the right and left fixed masts 45 is larger than the right and left width of the discharge duct 29 and is smaller than the distance between the insides of the right and left rear wheels 6. That is to say, in a back view, the right and left fixed masts 45 are respectively disposed between the right and left outside surface of the discharge duct 29 and the right and left rear wheels 6 (see FIG. 4).

Both the ends of the base frame 50, which is in a shape of a horizontally long pipe, are welded to the center of the right and left fixed masts 45 in the vertical direction. The bottom end of the lift cylinder 48 is connected to the center part of the base frame 50 through a receive bolt 51. The base frame 50 is disposed at a higher position than the top of the discharge duct 29. An auxiliary duct 52 is fixed to the bottom of the base frame 50. Accordingly, during a mowing operation, the gap formed between the discharge duct 29 and the grass collection box 30 is blocked by the auxiliary duct 52. The auxiliary duct 52 prevents the mowed grass from getting out between the discharge duct 29 and the grass collection box 30. To the bottom of the grass collection box 30, a cutout (not shown) that the auxiliary duct 52 can vertically pass through is formed. Accordingly, even if the grass collection box 30 moves vertically (moves up or moves down), the bottom of the grass collection box 30 does not contact with the auxiliary duct 52.

As shown in FIG. 5, both the ends of the horizontally long support frame 53 and a bearing receive plates 54 are integrally weld to the top ends of the right and left fixed masts 45. The middle part of the lift cylinder 48 is fixed to the support frame 53 through a U-shaped bolt 53a. The lift cylinder 48 is erected and approximately parallel to the fixed masts 45 at the center position between the right and left fixed masts 45. A piston rod 55 is extended upwardly from the top end of the lift cylinder 48.

As shown in FIGS. 3 to 5, the right and left movable masts 46 are disposed to be vertically slidable on the outside of the right and left fixed masts 45 through a plurality of guide rollers 56. The right and left movable masts 46 are connected to be vertically slidable through horizontal frames 57. The support frame 53 and the right and left movable masts 46 are interconnected by lift wires 58, 59 described below.

Both the ends of the left lift wire 58 are connected to the bottom end of the movable mast 46 on the left in the forward direction of the traveling body 1 through the wire fixture 60. A folding back pulley 63 is provided to the support frame 53 through a tension adjustment bolt 61 and a bearing body 62. The middle part of the left lift wire 58 is wound around the folding back pulley 63. Double pulleys 64a, 64b are provided to the top end of the left fixed mast 45 through the bearing receive plate body 54. A triple pulley 66 is provided to the top end of the piston rod 55 through a spindle 65. And, the left lift wire 58 shown with two-dot chain line in FIG. 5 is provided in a double stretched state between the wire fixture 60 and the folding back pulley 63, through the double pulleys 64a,64b and the pulleys 66a, 66b disposed on both sides of the triple pulley 66.

On the other hand, the end of the right lift wire 59 is connected to the bottom end of the movable mast 46 on the right side facing in the forward direction of the traveling body 1 through the wire fixture 67. A tension adjustment bolt 68 is provided on the support frame 53. The other end of the right lift wire 59 is connected to the tension adjustment bolt 68. A pulley 69 of the fixed mast side is provided at the top end of the right fixed mast 45 through the bearing receive plate 54. The right lift wire 59 shown with dashed line in FIG. 5 is provided in a single stretched state between a wire fixture 67 and the tension adjustment bolt 68 through the pulley 69 of the fixed mast side and the center pulley 66c of the triple pulley 66.

In the above configuration, when the piston rod 55 is advanced upwardly, and the triple pulley 66 is lifted up, the ascending stroke of the right and left masts 46 is twice as much as the advancing stroke of the piston rod 55. In addition, the left lift wire 58 is stretched double and the right lift wire 59 is stretched single, and thus even if the rotational force is generated around an axis line of the piston rod 55, the lift wire 58 opposes the rotational force and prevents rotation of the piston rod 55 about the axis line. Accordingly, the twists of the wires 58, 59 at the pulley 66 can be prevented. When the left lift wire 58 and the right lift wire 59 are configured with a wire with the same diameter, the supporting force of the left movable mast 46 (double lift wire 59) becomes larger than that of the right movable mast 46 (single lift wire 59) in the traveling direction of the traveling body 1.

As shown in FIGS. 3 to 5, the lift frame bodies 47 are disposed to be vertically slidable on the outside of the right and left movable masts 46 through a plurality of guide rollers 70. The lift frame bodies 47 comprise right and left fork bodies 71 extending approximately horizontally in the front and back direction and dump fulcrum shafts 72 supporting the above described grass collection box 30 rotatably. The lift frame bodies 47 are supported to the right and left movable masts 46. The front end of the right and left fork bodies 71 are connected to the lift frame bodies 47. The dump fulcrum shafts 72 are disposed in the rear end of the right and left fork bodies 71. Thus, the grass collection box 30 rotates around the dump fulcrum shafts 72 to the backward of the traveling body 1.

Tension adjustment bolts 73 are provided outside the right and left of the lift frame bodies 47. Both the ends of right and left lift-up wires 74 are connected to the tension adjustment bolts 73 and the right and left bearing receive plate bodies 54. Lift-up pulleys 75 are provided to the top end of the right and left movable masts 46 respectively. The right and left lift-up wires 74 shown with dashed lines in FIG. 5 are provided in a stretched state through the lift-up pulleys 75. That is to say, the ascending stroke of the lift frame body 47 is twice as much as that of the movable mast 46.

Accordingly, the ascending stroke of the lift frame body 47 is four times as much as the advancing stroke of the piston rod 55. As a result, the elevating length of the grass collector 30 can be made to large by use of an inexpensive lift cylinder 48 having a piston rod 55 of short advancing/retracting stroke. In the rear of the traveling body 1, the grass collection box 30 can be lifted up by the maximum lift height H from a grass collection position to a grass discharging position (see FIG. 4).

Next, referring to FIG. 3 and FIG. 6, the structure of the grass collection box 30 is described. As shown in FIG. 3 and FIG. 6, the grass collection box 30 includes a grass collection main body 76 communicating with the discharge duct 29 and a cover 77 shutting an opening in the rear face of the grass collection main body 76 openably and closably. The grass collection box 30 in a square box shape is formed in such a way that the cover 77 shaped triangle in a side view is devised with the grass collection main body 76 shaped trapezoid in a side view.

The rear end of the bottom of the grass collection main body 76 (the bottom end of the rear opening side of the grass collection main body 76) is connected to the dump fulcrum shaft 72. A dump cylinder 78 is disposed outside the fork body 71 on the left side in the traveling direction of the traveling body 1. The dump cylinder 78 is connected to the left fork body 71 through a cylinder connection shaft 78a. A dump arm 79 is provided on the left side end of the dump fulcrum shaft 72. The dump arm 79 is connected to the top end of the piston rod 80 of the dump cylinder 78 with a shaft 81. Accordingly, by advancing the piston rod 80, the grass collection main body 76 rotates backward about the dump fulcrum shaft 72. That is to say, the flat bottom of the grass collection main body 76 is inclined with its affront high and rear low. The rear end of the grass collection main body 76 opens obliquely downward to the rear (see FIG. 6).

An opening/closing fulcrum shaft 83 is disposed at the rear end of the top face frame 82 of the grass collection main body 76 (the top end of the rear opening of the grass collection main body 76). The front end of the top face of the cover 77 is connected to the opening/closing fulcrum shaft 83. The cover 77 rotates about the opening/closing fulcrum shaft 83 and moves from an open position to a closed position. The right and left ends of the opening/closing fulcrum shaft 83 are projected in both the right and left direction of grass collection main body 76. One ends of paired right and left opening/closing operation arms 84 are respectively connected to the right and left ends of the opening/closing fulcrum shaft 83. Ends of an opening/closing operation link 87 are connected to the fork body 71, which is in the front side of the dump fulcrum shaft 72, and to the other end of the opening/closing operation arm 84, which is extended forward from the opening/closing fulcrum shaft 83, through shafts 85, 86 respectively. An opening/closing link mechanism 88 is formed by the right and left pair of opening/closing operation arms 84 and the right and left pair of the opening/closing operation links 87. The opening/closing link mechanism 88 works with the rotation of the grass collection main body 76 about the dump fulcrum shaft 72 (see FIG. 6).

That is to say, when the grass collection main body 76 rotates backward about the dump fulcrum shaft 72 and moves to a discharge position of the mowed grass, the opening/closing fulcrum shaft 83 rotates backward about the dump fulcrum shaft 72. Also, the opening/closing fulcrum shaft 83 moves in a direction away from the shaft 85. The opening/closing operation arm 84 is pulled by the opening/closing operation link 87 of a constant length. That is to say, the cover 77 rotates backward about the opening/closing fulcrum 83 by the opening/closing link mechanism 88, and moves to the opening position (a position illustrated in a solid line in FIG. 6). The grass collection main body 76 and the cover 77 are connected through the opening/closing fulcrum shaft 83 in an inversed-V shape. The rear opening of the grass collection main body 76 is opened obliquely downward to the rear. The front opening of the cover 77 is opened obliquely downward to the front. Accordingly, the mowed grass 89 in the grass collection main body 76 and the cover 77 are dropped into the approximately center of the top opening of the lower container 90 (see FIG. 6).

On the other hand, with retraction of the piston rod 80 caused by the operation of the dump cylinder 78, the grass collection main body 76 rotates forward about the dump fulcrum shaft 72 and returns to the position for collecting mowed grass. In the case, in association with the rotation of the grass collection main body 76 about the dump fulcrum shaft 72, the cover 77 is rotated forward about the opening/closing fulcrum shaft 83 by the opening/closing link mechanism 88 and returns to the closed position (a position illustrated in a solid line in FIG. 3)

Next, referring to FIG. 7, a hydraulic circuit 91 of the lawn mower of the present embodiment is described. As shown in FIG. 7, the hydraulic circuit 91 comprises a hydraulic charge pump 92 actuated by rotational force of the engine 9, a hydraulic shift pump 93 of a variable capacity type, and a hydraulic shift motor 94 of a constant capacity type operated by high-pressure fluid oil discharged from the hydraulic shift pump 93. A continuously variable, hydrostatic transmission 95 is comprised of the hydraulic shift pump 93 and the hydraulic shift motor 94. The continuously variable, hydrostatic transmission 95 is built in the transmission case 19 described above. The rotational power of the engine 9 is shifted by the continuously variable, hydrostatic transmission 95, and the shifted output is transmitted to the right and left rear wheels 6.

As shown in FIG. 7, the suction side and the discharge side of the hydraulic shift pump 93 and those of the hydraulic shift motor 94 are connected to each other through a closed loop hydraulic circuit 96. The hydraulic shift pump 93 is driven by the power of the engine 9. When, an angle of a cam plate 97 of the hydraulic shift pump 93 is adjusted by operating the gear shift pedal 12, a rotational output of the hydraulic shift motor 94 is changed. The number of revolutions of the axle 38 driven through the hydraulic shift motor 94 is varied. Thus, the rotational speed of the rear wheels 6 driven through the axle 38 is varied.

As shown in FIG. 7, the hydraulic circuit described above comprises relief valves, oil filters, check valves, etc. A strainer 99 in the oil tank 21 (a hydraulic fluid tank) is connected to the suction side of the hydraulic charge pump 92 through a low-pressure charge oil passage 98. A high-pressure charge oil passage 102 is connected to the discharge side of the hydraulic charge pump 92. A relief valve 100 for supplying and a relief valve 101 for returning are disposed in the high-pressure charge oil passage 102. The high-pressure charge oil passage 102 is connected to a closed loop oil circuit 96 through the relief valve 100 for supplying, a check valve 103 for forward travel supplying, and the check valve 104 for reverse travel supplying.

Accordingly, hydraulic fluid from the hydraulic charge pump 92 is always supplied to the closed loop oil passage 96 during the operation of the engine 9. Also, if there is surplus hydraulic fluid in the charge oil passage 98, 102 that supply hydraulic fluid from the hydraulic charge pump 92 to the closed loop oil passage 96, the surplus hydraulic fluid in the charge oil passages 98, 102 is returned to the oil tank 21 through the relief valve 101 for returning.

On the other hand, a bypass valve 105 is connected to the closed loop oil passage 96. The suction side and discharge side of the hydraulic shift pump 93 and those of the hydraulic shift motor 94 are short-circuited by the bypass valve 105. When the bypass valve 105 is switched, as shown in FIG. 7, by the operation of a bypass switch lever 106 and the suction side and the discharge side of the hydraulic shift pump 93 and those of the hydraulic shift motor 94 are off (the state of the bypass valve 105 shown in FIG. 7), the hydraulic shift pump 93 and the hydraulic shift motor 94 are connected in a traveling drive state, and the rear wheels 6 are driven by the rotational power of the engine 9.

On the other hand, when the bypass valve 105 is switched by the operation of the bypass switch lever 106, and thus the suction side and the discharge side of the hydraulic shift pump 93 and those of the hydraulic shift motor 94 are short-circuited, the hydraulic shift motor 94 can be held in a freely rotating state (a freely rotating state under a no-load condition). For example, if there is a failure that fuel in the fuel tank 20 disappears, and the rear wheels cannot be driven by the power of the engine 9, the operator can operate the bypass switching lever 106 to switch the bypass valve 105, and can push the traveling body 1 to move with keeping the stepless speed device 95 of the transmission case 19 in a no-load condition.

As shown in FIG. 7, a hydraulic lift valve 107 for lifting is provided for supplying to hydraulic fluid a lift cylinder 48 of a double-acting type for lifting the grass collection box 30. The hydraulic charge pump 92 is connected to the hydraulic lift valve 107 for lifting through a check valve 108 for preventing malfunction. A dump valve 109 is provided for discharging the mowed grass 89 in the grass collection box 30. The dump valve 109 is connected to a tank port of the lift valve 107. Accordingly, when the operator operates a lift lever 110 to switch the lift valve 10 and operates the lift cylinder 48, the grass collection box 30 in a position for collecting grass starts rising. When the operator operates a dump lever 111 to switch the dump valve 109 and operates the dump cylinder 78, as shown in FIG. 6, the grass collection box 30 starts dumping operation, and the mowed grass in the grass collection box 30 is discharged into the container 90.

When the mowed grass in the grass collection box 30 is completely discharged, the operator operates the dump lever 111 to return the grass collection box 30 to a supporting position of the lift frame body 47. Then, the operator operates the lift lever 110, putting the grass collection box 30 back in the position for collecting grass in the rear part of the traveling body 1. The operation for mowing grass, etc is restarted.

The torque generator 2 for power steering is connected to the tank port of the tank valve 109. The torque generator 2 is also connected to the returning relief valve 101 through a line filter 112 and a relief valve 113. The torque generator 2 is composed of a control valve (not shown) switched by the operation of the steering wheel 10, a hydraulic pump operated through the control valve, and the like. The torque generator 2 generates large hydraulic power by the operation of the steering wheel 10. The front wheels 5 are changed in direction (steered) by large hydraulic power of the torque generator 2 (a hydraulic pump). The hydraulic fluid from the torque generator 2 is returned to the oil tank 21 through the line filter 112.

The lift valve 107, the dump valve 109, and the torque generator 2 are connected in series with respect to the hydraulic charge pump 92. During the operation of a lift cylinder 48 after switching the lift valve 107, neither the dump cylinder 78 nor the torque generator 2 is operated. During the operation of the dump cylinder 78 after switching the dump valve 109, torque generator 2 not operated. When neither the lift cylinder 48 nor the dump cylinder 78 is operated, the torque generator 2 is operated. That is to say, the lift cylinder 48 is operated preferentially to the dump cylinder 78 and the torque generator 2. Also, the dump cylinder 78 is operated preferentially to the torque generator 2. Therefore, the hydraulic charge pump 92 can be formed by using an inexpensive hydraulic pump with a small capacity (small output), and thus, manufacturing cost of the hydraulic system can be reduced.

Figure 8:
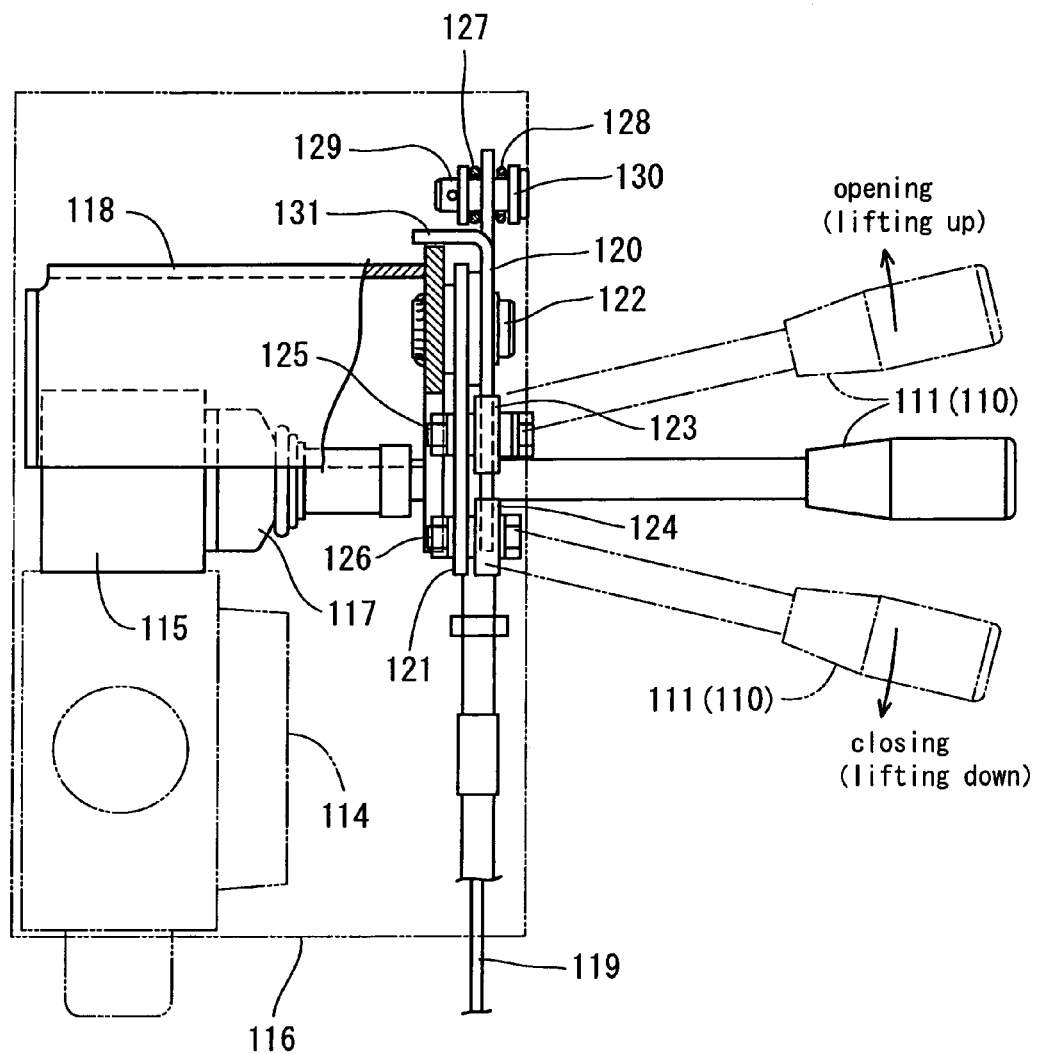
FIG. 8 is a side view showing a fixed portion of a lift lever and a dump lever.
Figure 9:
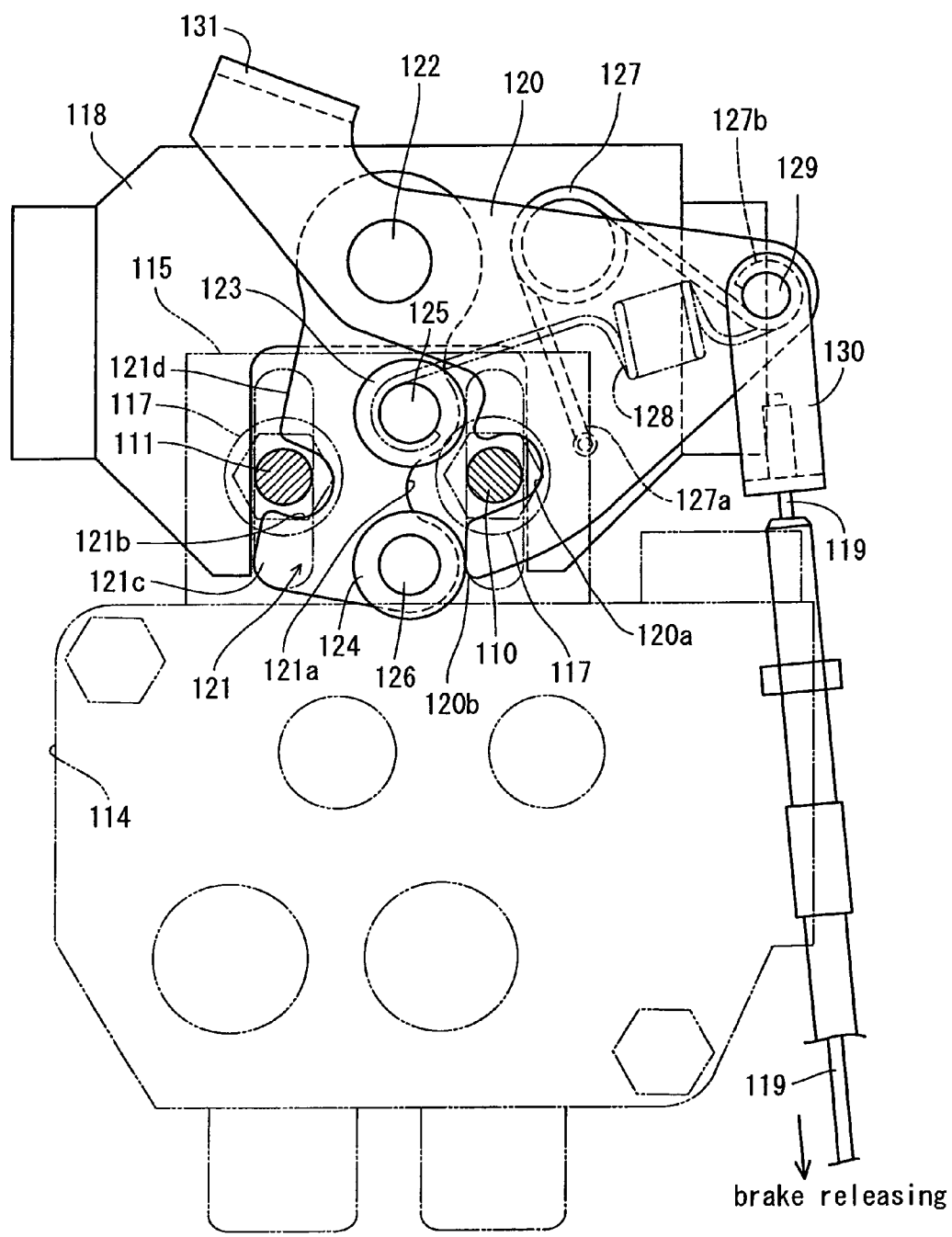
FIG. 9 is a plan view showing the fixed portion of the lift lever and the dump lever.

Next, referring to FIGS. 8 to 11, a mounting structure of the lift lever 110 and the dump lever 111 is described. As shown in FIG. 8 and FIG. 9, a hydraulic piping block 114 and a hydraulic valve device body 115 are provided inside a hydraulic device case 116. The hydraulic piping block 114 connects hydraulic piping (not shown) to the hydraulic charge pump 92, the lift cylinder 48, and the dump cylinder 78. The hydraulic valve device body 115 includes the lift valve 107 and the dump valve 109.

The bottom end of the hydraulic valve device body 115 is integrally fixed to the top end of the hydraulic piping block 114. Also, on top side of the rear part of the rear cover 14, the hydraulic device case 116 is disposed through the right body frame 4 (see FIG. 1). The hydraulic device case 116 is disposed obliquely backward from the right side of the driver seat 15 (see FIG. 2).

As shown in FIGS. 8 to 11, the lift lever 110 and the dump lever 111 are disposed to be vertically movable through a lever bearing part 117 on the front face of the hydraulic valve device body 115. When the lift valve 107 is in a neutral position, the lift lever 110 is projected to the hydraulic valve device body 115 approximately horizontally. When the operator holds the lift lever 110 and rotates it upwardly or downwardly about a fulcrum of the lever bearing part 117, the lift valve 107 is switched to an ascending side or a descending side, and the lift cylinder 48 is operated in the ascending side or descending side. When the dump valve 109 is in a neutral position, the dump lever 111 is projected to the hydraulic valve device body 115. When the operator holds the lift lever 111 and rotates it upwardly or downwardly about the fulcrum of the lever bearing part 117, the dump valve 109 is switched to the opening side or closing side, and the dump cylinder 78 is operated in the opening side or closing side.

As shown in FIG. 8 and FIG. 9, a locking arm body 120 and a restraining arm body 121 are supported via a spindle 112 by a lever guide body 118 provided in side the hydraulic device case 116. The lift lever 110 and the dump lever 111 are rotatably guided upwardly or downwardly by the lever guide body 118. The locking arm body 120 is connected to the brake pedal 13 through the braking detection wire 119. By switching operation of either the lift lever 110 or the dump lever 111, switching operation of the other thereof is restricted by the restricting arm body 121.

As shown in FIG. 9, a mowed grass discharge control notch 120a is formed in the locking arm body 120. The middle part of the lift lever 110 is engaged with in the mowed grass discharge control notch 120a. A lift checking notch 121a and a dump checking notch 121b are formed in the check arm body 121. The middle part of the lift lever 110 is engaged with the lift checking notch 121a. The middle part of the dump lever 111 is engaged with the dump checking notch 121b. A pair of pressure rollers 123, 124 is supported by the check arm body 121 through roller shafts 125, 126. The pair of pressure rollers 123,124 is contacted with the middle part of the lift lever 110. The pair of pressure rollers 123, 124 are disposed so as to interpose the lift checking notch 121a therebetween.

As shown in FIG. 9, a braking detection spring 127 in a shape of a clip spring and a release spring 128 in a shape of a tension spring are provided. One end 127a of the braking detection spring 127 is hooked to the locking arm body 120. The other end 127b of the braking detection spring 127 is hooked to a connecting pin 129 described below. The braking detection spring 127 rotates the locking arm body 120 in a direction that the mowed grass discharge notch 120a is separated from the lift lever 110. Both ends of the release spring 128 are hooked to a roller shaft 125 and the connecting pin 129 respectively. The release spring 128 rotates the checking arm body 121 in a direction that the dump checking notch 121b is separated from the dump lever 111.

As shown in FIG. 8 and FIG. 9, the middle part of the locking arm body 120 is fitted to the spindle 122. A fitting part 130 attached to the one end of the braking detecting wire 119 is engaged with one end of the locking arm body 120 through the connecting pin 129. Also, a stopper body 131 is integrally formed with the other end of the locking arm body 120. The stopper body 131 supports the locking arm body 120 in a position where the mowed grass discharge notch 120a is separated from the lift lever 110.

The spring force of the braking detection spring 127 is arranged to be smaller than that of the pedal returning spring which is not shown in figures and holds the brake pedal 13 at an initial position (a brake releasing position). The spring force of the release spring 128 is arranged to be smaller than that of the braking detection spring 127.

In the configuration described above, as shown in FIG. 9, when the brake pedal 13 is held in the initial position (a brake releasing position) by the pedal returning spring, which is not shown, the braking detecting wire 119 is pulled by the spring force of the pedal returning spring. Therefore, the locking arm body 120 is held in an approximately constant position while opposing the spring force of the braking detection spring 127. That is to say, a state that the lift lever 110 is engaged with the mowed grass discharge notch 120a is maintained. On the other hand, a side edge 120b of the locking arm body 120 and the pressure roller 124 contact with each other by the spring force of the release spring 128. Therefore, the check arm body 121 is held in an approximately constant position. That is to say, a state that the dump lever 111 is locked in the dump checking notch 121b is maintained.

Accordingly, while the brake pedal 13 is not depressed by the operator and thus is not both the operation of the lift lever 110 and that of the dump lever 111 are restricted by the locking arm body 120 and the restricting arm body 121. In the case of mowing grass etc., the operator separates the right foot from the brake pedal 13 and depresses the shift pedal 12 with the right foot. Subsequently, the traveling body 1 moves, the mowing operation is performed, and the grass mowed by the mower device 16 is collected to the grass collection box 30.

Figure 10:
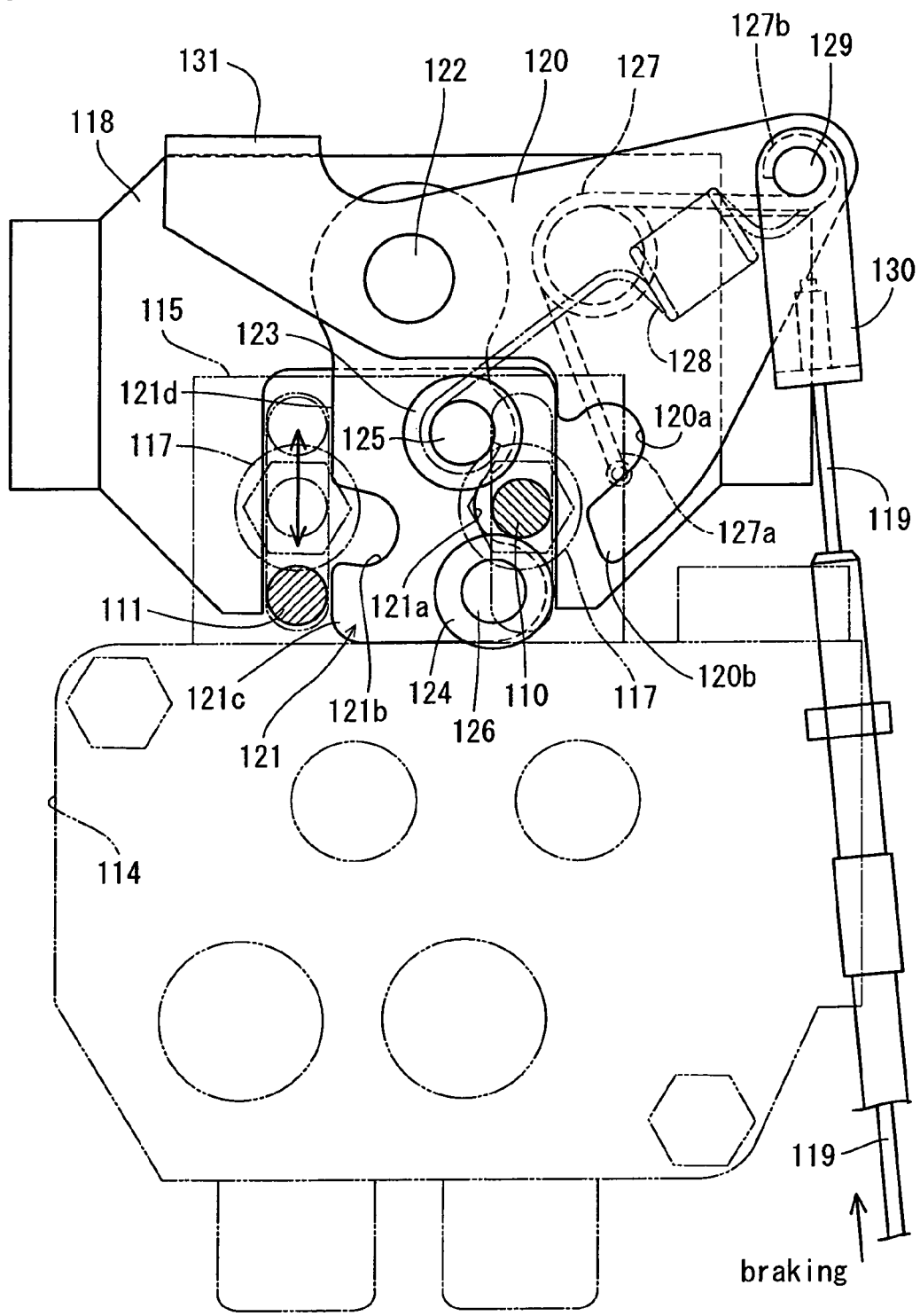
FIG. 10 is a drawing explaining an operation of a dump lever.

On the other hand, as shown in FIG. 10, when the rear wheels 6 are braked by the operation of the brake pedal 13 by the operator, the braking detecting wire 119 is loosened. Thus, by spring force of the braking detection spring 127, the position of the locking arm body 120 is held and the lift lever 110 is held to be away from the mowed grass discharge notch 120a. In the case, the stopper 131 contacts the top of the lever guide body 118. Also, the lift lever 110 and the pressure rollers 123,124 are in contact with each other by the spring force of the release spring 128. Therefore, the check arm body 121 is held in the position, and a state that the dump lever 111 is away from the dump checking notch 121b is maintained.

That is to say, in the state of FIG. 10 where the dump checking notch 121b is away from the dump lever 111, the lift lever 110 or the dump lever 111 can be operated by the operator. In that state, the check arm body 121 is apart from the dump lever 111 by the spring force of the release spring 128. Thus, when the dump lever 111 is operated by the operator (the dump cylinder 78 is in operation), the dump lever 111 moves to a contact position with a regulation end 121c or 121d of the check arm body 121. Therefore, the position of the check arm body 121 is held, between and a state that the lift lever 110 is locked in the lift checking notch 121a each pressure rollers 123, 124 is maintained.

When the dump lever 111 is operated by the operator, the regulation end 121c or 121d of the check arm body 121 contacts with the dump lever 111, and the movement of the check arm body 121 is blocked by the dump lever 111. Accordingly, even if the operator tries to operate the lift lever 110, the lift lever 110 cannot be operated because the lift lever 110 is supported between the pressure rollers 123,124. In other words, in the state of FIG. 9 (the dump cylinder is in operation), where the dump lever 111 is operated, the operation of the lift lever 110 is inhibited by the check arm body 121.

Figure 11:
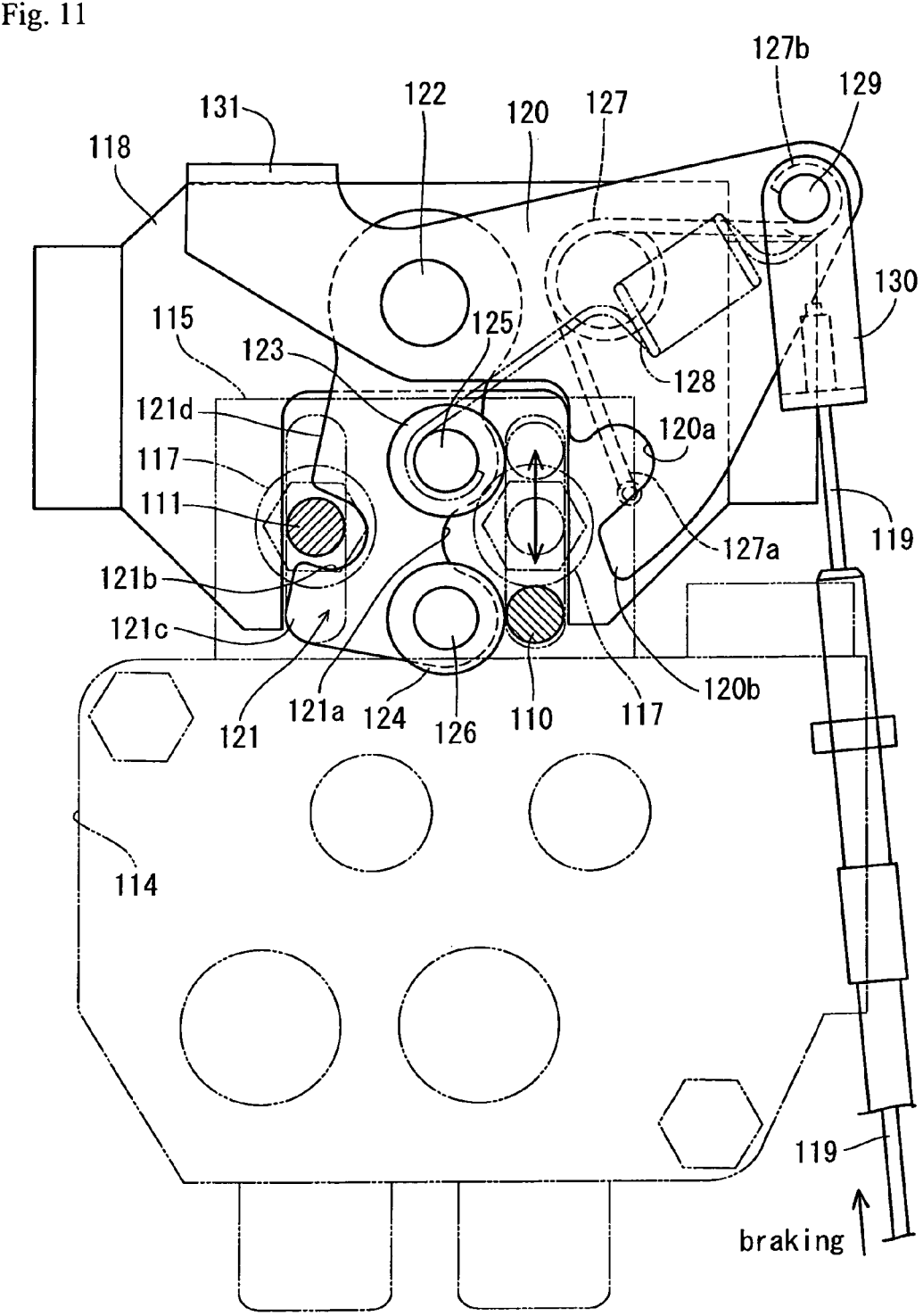
FIG. 11 is a drawing explaining an operation of a lift lever.

On the other hand, as shown in FIG. 11, when the lift lever 110 is operated in the ascending (descending)) direction by the operator (the lift cylinder 48 is in operation), the lift lever 110 pushes the pressure roller 123 (or pressure roller 124) while opposing the release spring 128. Therefore, a position of the check arm body 121 is kept, and the state that the dump checking notch 121b is locked to the dump lever 111 is maintained. In other words, in the state of FIG. 11 that the lift lever 110 is operated, an operation of the dump lever 111 is inhibited by the check arm body 121. It is noted that when the mowed grass discharge notch 120a is separated from the lift lever 110, the operator can operate either the lift lever 110 or the dump lever 111 alternatively.

Figure 12:
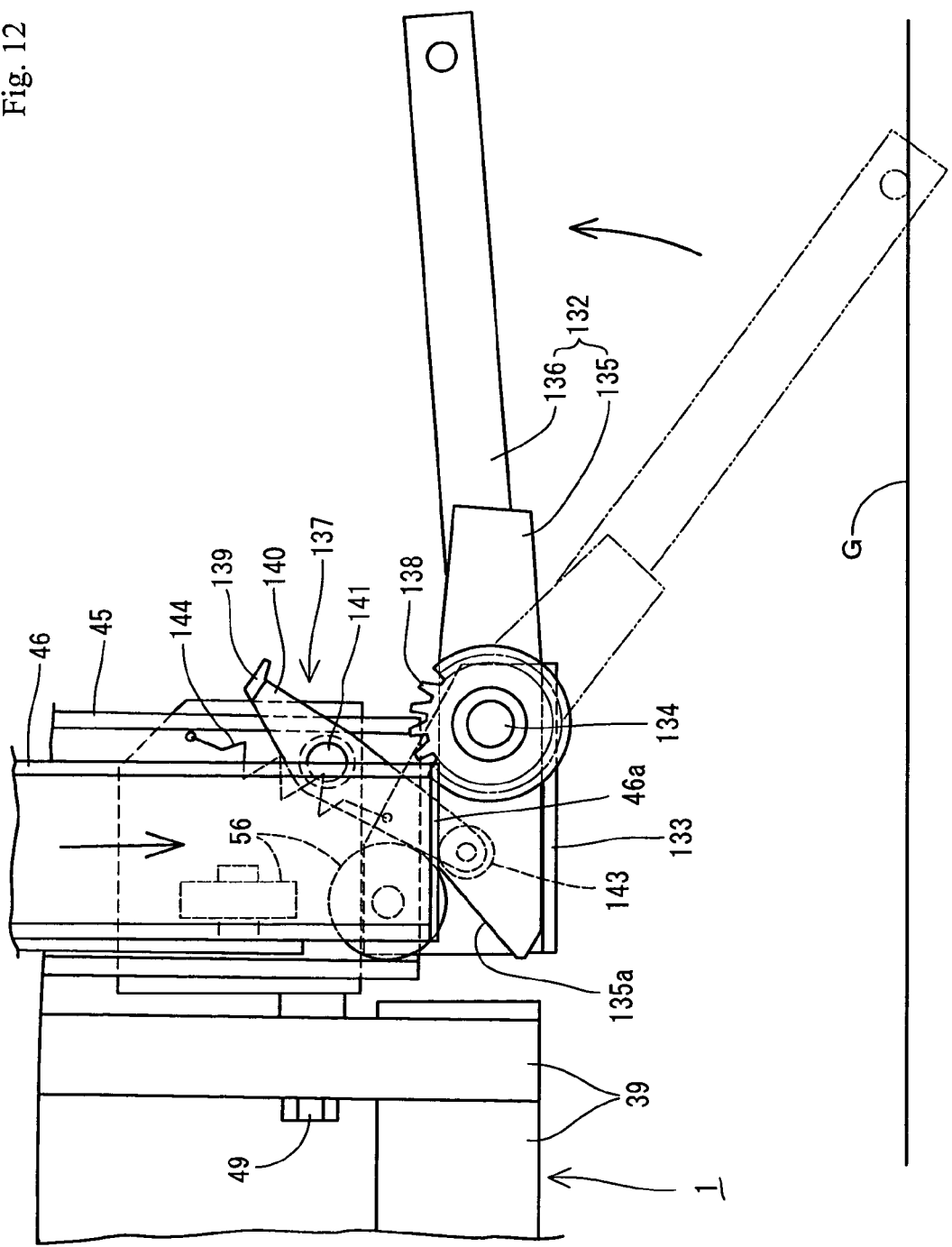
FIG. 12 is a side view showing a fixed portion of a supporting leg body.
Figure 13:
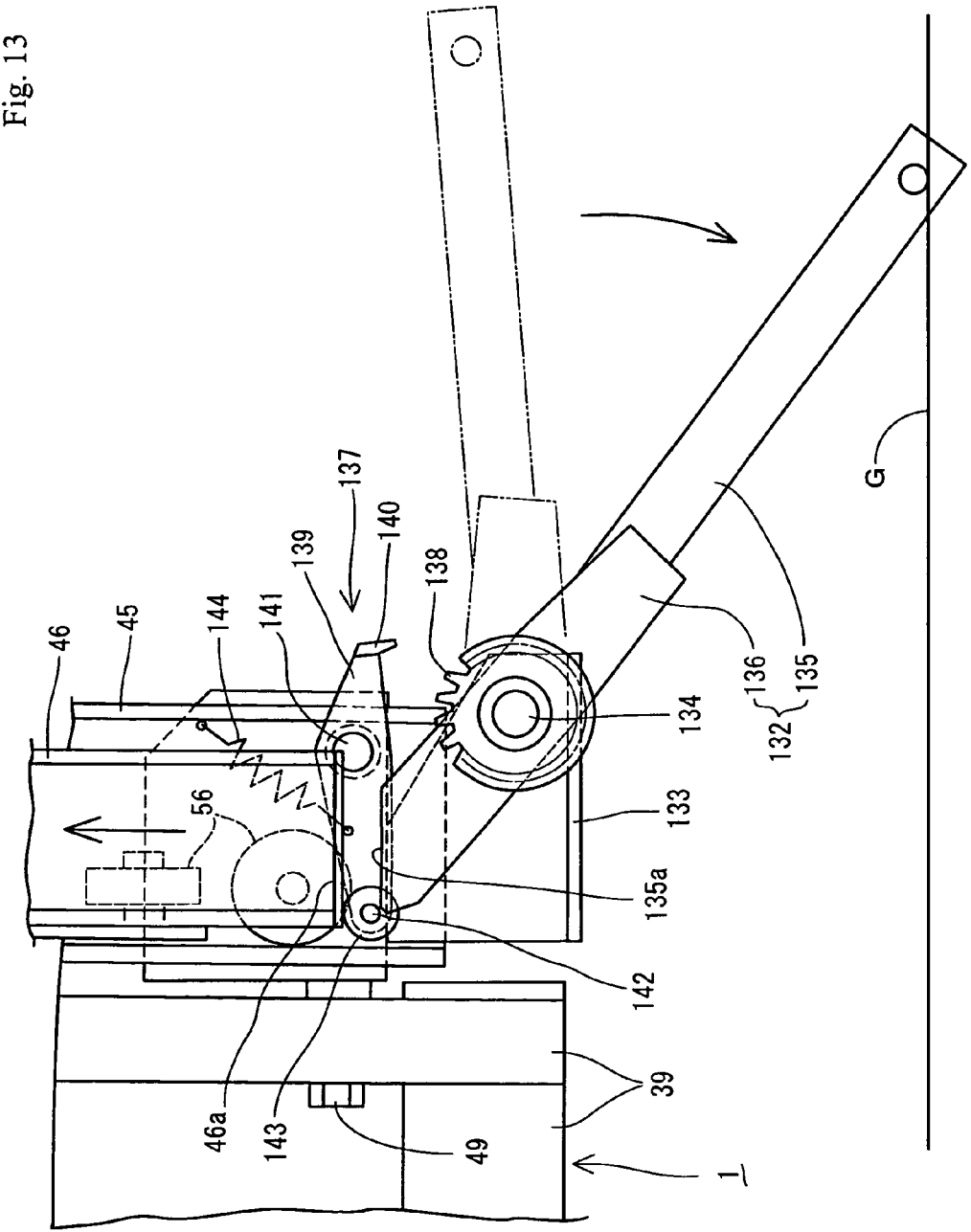
FIG. 13 is a side view showing a state that the supporting leg body is landed.
Figure 14:
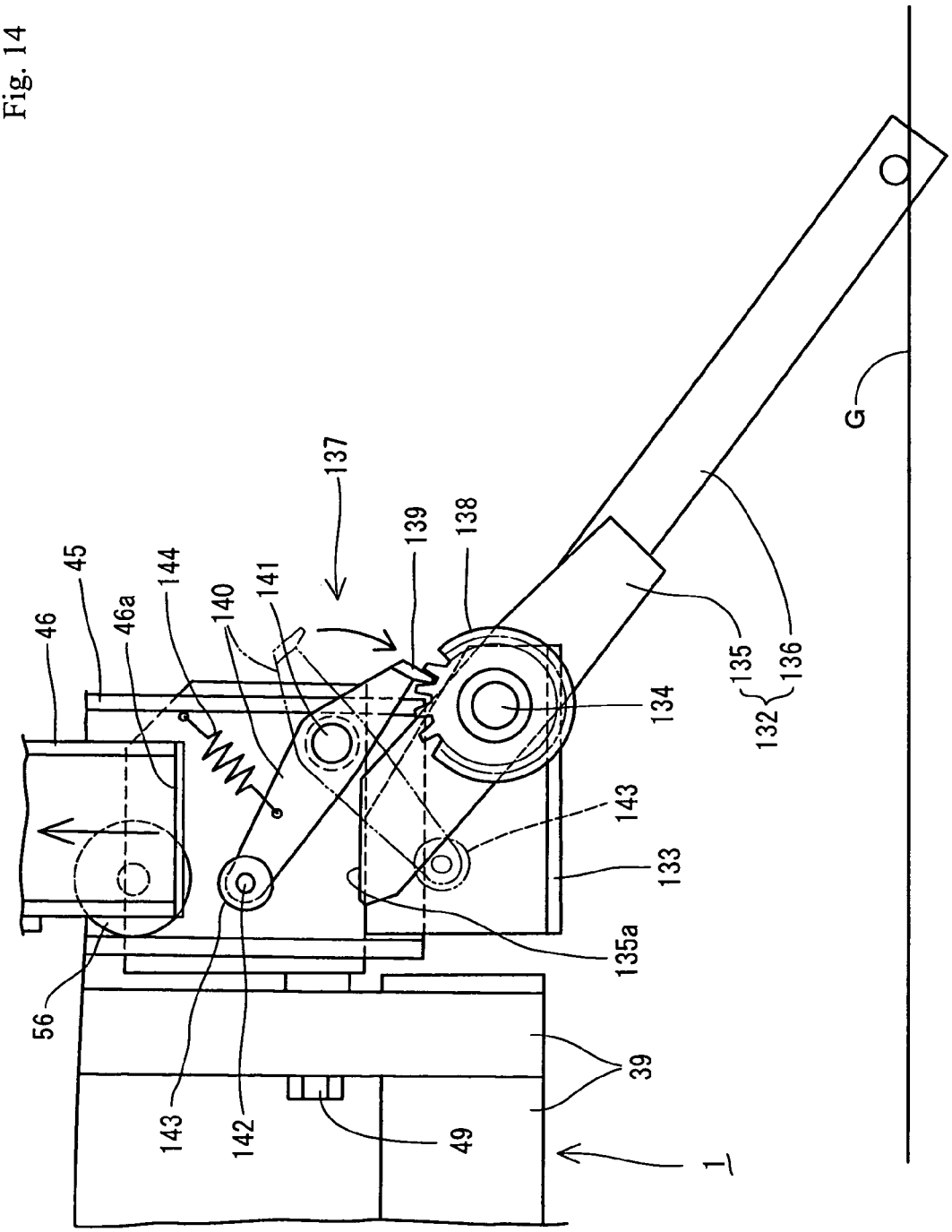
FIG. 14 is a side view showing a state that the supporting leg is locked in a landing position.

Next referring to FIGS. 12 to 14, a mounting structure of a supporting leg body 132 as an outrigger preventing turnover of the traveling body 1 is described. As shown in FIGS. 12 to 14, an outrigger support frame 133 is welded to the lower end of the fixed mast 45. A middle part of a leg body base 135 of the supporting leg body 132 is supported by the outrigger supporting frame 133 through the outrigger supporting shaft 134. A top end of the leg body 136 of the supporting leg body 132 is connected to the one end of the leg body base 135. A taking in/out operation part 135a of the other end of the leg body base 135 is extended to the lower part of the mast base 46a of the movable mast 46. When the movable mast 46 is moved down, the mast base 46a comes into contact with the taking in/out operation part 135a from above.

That is to say, during a mowing operation in which the movable mast 46 is supported at the lowest position, the mast base 46a contacts the taking in/out operation part 135a from above. Therefore, the end of the leg body 136 is lifted up to the retracted position far from the road surface. On the other hand, when the movable mast 46 is moved up, and the grass collection box 30 is lifted up to a high place, the mast base 46a separates from the taking in/out operation part 135a. Therefore, the supporting leg body 132 is rotated about the outrigger supporting shaft 134 by the self weight of the end part of the leg body 136. Thus, the end of the leg body 136 lands on the road surface.

In the above-described embodiment, the end of the leg body 136 is configured to land on the road surface by self weight of the end of the leg body 136 as the movable mast 46 is moved up, and also a spring may be provided for rotating the supporting leg body 132. The supporting leg body 132 is rotated about the outrigger supporting shaft 134 by the spring (in the landing direction of the end of the leg body 136), and the end part of the leg body 136 is oppressed to the road surface by the spring.

As shown in FIGS. 12 to 14, an outrigger locking mechanism 137 to support the supporting leg body 132 in a landing position is provided. The outrigger locking mechanism 137 has a ratchet gear 138 and a ratchet arm 140. The ratchet gear 138 is fitted to the outrigger supporting shaft 134. A ratchet pawl 139 for locking the ratchet gear 138 in an engaging or disengaging manner is integrally formed to with one end of the ratchet arm 140 lock the ratchet gear 138. The supporting leg body 132 and the ratchet gear 138 are integrally about coupled each other. The supporting leg body 132 and the ratchet gear 138 integrally rotate about the outrigger supporting shaft 134.

A lock fulcrum shaft 141 is disposed in the fixed mast 45. The middle part of the ratchet arm 140 is rotatably fitted to the lock fulcrum shaft 141. A contracting roller 143 is supported to the other end of the ratchet arm 140 through the roller shaft 142. A ratchet spring 144 is connected between the fixed mast 45 and the ratchet arm 140. The ratchet pawl 139 is engaged with the ratchet gear 138 by the ratchet spring 144.

In the configuration described above, as shown in FIG. 12, while the movable mast 46 is supported at the lowest position, and the grass collection box 30 is supported at a collecting position in the rear of the traveling body 1 (i.e., during a mowing operation in which the movable mast 46 is supported at the lowest position), the mast base 46a contacts the taking in/out operation part 135a of the supporting leg body 132. And the end of the leg body 136 of the supporting leg body 132 is lifted up to a retracted position as shown in the solid line in FIG. 12. In the case, the ratchet arm 140 also contacts with the mast base 46a through the contracting roller 143. The ratchet pawl 139 is supported in a position which is separated from the ratchet gear 138 against the ratchet spring 144. Therefore, the supporting leg body 132 is held in a lower retracted position of the grass collection box 30.

As shown in FIG. 13, when the movable mast 46 is lifted from the lowest position in FIG. 12, the mast base 46a firstly separates from the taking in/out operation part 135a. Therefore, the end of the leg body 136 drops by its weight to a landing position as shown in the solid line in FIG. 13, the end of the leg body 136 lands in the landing surface G (road surface). Secondly, when the movable mast 46 is further lifted from the landing position of the supporting leg body 132 of FIG. 13, the mast base 46a separates from the contracting roller 143 as shown in FIG. 14. Therefore, the ratchet arm 140 rotates into a position as shown in a solid line of FIG. 14 by the ratchet spring 144. And, the ratchet pawl 139 is locked to the ratchet gear 138 by the ratchet spring 144. Thus, the supporting leg body 132 is supported in such a way that the supporting leg body 132 remains on the landing surface G (road surface).

That is to say, when the grass collection box 30 is lifted up in a high place (the discharge position of mowed grass 89 shown in FIG. 6), by locking the ratchet pawl 139 with the ratchet gear 138, the supporting leg body 132 is held in a landing position on the landing surface G. In the state, when the traveling body 1 inclines to the right or left, the traveling body 1 is supported by the supporting leg body 132 on the inclined side. Accordingly, the traveling body 1 can be prevented from inclining to a turnover angle, and the turnover of traveling body 1 can be prevented.

On the other hand, for example, when discharge of the mowed grass 89 in the grass collection box 30 is completed, the grass collection box 30 is lifted down in a position for collecting grass (position for mowing and collecting grass shown in FIG. 3). When the grass collection box 30 is lifted down in a position for collecting grass, the movable mast 46 firstly moves down under a state of FIG. 14 that the ratchet pawl 139 is engaged with the ratchet gear 138. Then, as shown in FIG. 13, the mast base 46a comes into contact with the contracting roller 143. Therefore, the ratchet arm 140 rotates in a position shown in a solid line in FIG. 13 against the ratchet spring 144. Accordingly, the ratchet pawl 139 is separated from the ratchet gear 138.

Next, when the movable mast 46 further moves down from the disengaged position of the ratchet pawl 139 of FIG. 13, (i.e., from the landing position of the supporting leg body 132), the mast base 46a contacts the taking in/out operation part 135a of the supporting leg body 132 as shown in FIG. 12. By dissension of the movable mast 46, the supporting leg body 132 comes to rotate about the outrigger supporting shaft 134. The end of the leg body 136 of the supporting leg body 132 is lifted up to the retracted position of the supporting leg body 132 as shown in a solid line in FIG. 12. That is to say, the supporting leg body 132 is supported in the retracted position that is higher than the bottom of the fixed mast 45. Therefore, when the traveling machine 1 is moved, and the mowing operation is carried out, the supporting leg body 132 is held backward in an approximately horizontal manner in the vicinity of the bottom of the grass collection box 30. Accordingly, the supporting leg body 132 is prevented from colliding with the road surface, an obstacle etc. and from being damaged.

As is apparent from the above description and FIGS. 3 to 5, the following are provided: a mower device 6 mounted on a traveling body 1 having right and left rear wheels 6 (traveling part), a grass collection box 30 as a grass collector for collecting grass mowed by the mower device 16, a discharge duct 29 for discharging the mowed grass from the mower device 16 into the grass collection box 30, and a lift mechanism 31 having right and left fixed masts 45 for supporting the grass collection box 30 to the traveling body 1 to be lifted up and down. It is configured that the mowed grass 89 in the grass collection box 30 is discharged by lifting up the grass collection box 30 by the lift mechanism 31. The lift mechanism 31 is disposed in the lateral width of the grass collection box 30. The discharge duct 29 is disposed between the right and left fixed masts 45. It is configured that the discharge duct 29 and the grass collection box 30 are connected with the right and left fixed masts 45. Therefore, the lift mechanism 31 can be disposed in the right and left width of the right and left rear wheels 6, and the lift mechanism is prevented from colliding with a standing tree, a fallen tree or an obstruct such as stones on the ground and from being damaged. Also, the right and left width of the grass collection box 30 can be enlarged, and the volume thereof can be increased. In addition, between the right and left fixed masts 45, in the other words, in the vicinity of the approximate center of the right and left width of the traveling body 1, the grass collection box 30 can be connected to the mower device 16 through the discharge duct 29 extending approximately linearly. Accordingly, in comparison with the conventional structure that the forcible transport mechanism to discharge mowed grass 89 from the mower device 16 to the grass collection box 30 is specially provided outside the traveling body 1, the right and left width of the traveling body 1 can be reduced, and the mowed grass 89 can be discharged from the mower device 16 into the grass collection box 30 with a simple transportation structure.

As is apparent from the above description and FIGS. 3 to 5, the lift mechanism 31 comprises right and left movable masts 46 liftably supported with respect to right and left masts 45, a lift frame body 47 liftably disposed with respect to the movable masts 46, and a lift cylinder 48 as a lift drive means for lifting up and down the lift frame body 47. The lift cylinder 48 is disposed on a base frame 50 connected to the right and left fixed masts 45 above the discharge duct 29. Therefore, the base frame 50 can be used as both the supporting means of the right and left fixed masts 45 and the supporting means of the lift cylinder 48. Accordingly, the assembling structure of the right and left fixed mast 45 and the lift cylinder 48 can simply be configured. Also, by the right and left fixed masts 45 and the base frame 50, both the right and left sides and the top side of the discharge duct 29 can be enclosed. Accordingly, the discharge duct 29 and the grass collection box 30 can simply be connected.

As is apparent from the above description and FIG. 3, FIG. 12, mast supporting bodies 45a of the right and left fixed masts 45 are connected to the rear end of the body frame 3,4 of the traveling body 1. On the other hand, the right and left rear wheels 6 (traveling parts) are attached to the right and left axle frames 39 of the traveling body 1. The bottom ends of the right and left fixed masts 45 are connected to the right and left axle frames 39. Also, the right and left fixed masts 45 are supported to the body frame 3,4 and the right and left axle frames 39. Therefore, the connection strength of the body frame 3,4 and the right and left axle frames 39 can be improved by the right and left fixed masts 45. Also, the connection strength of the body frame 3,4 and the right and left fixed masts 45 can be improved by the right and left axle frames 39. That is to say, the right and left rear wheels 6 and the grass collection box 30 can be supported with high rigidity.

As is apparent from the description and FIGS. 12 to 14, a supporting leg body 132 approaching to landing direction by upward movement of a grass collection box 30 toward a position for discharging mowed grass is provided. The leg supporting body 132 is moved apart in the direction of the ground (upside of the traveling road surface) by downward movement of the grass collection box 30 toward a position for collecting grass. Also, an outrigger locking mechanism 137, which locks the supporting leg body 132 in a landing position by upward movement of the grass collection box 30 toward a position for discharging mowed grass, is provided. The supporting leg body 132 and the outrigger locking mechanism 137 are disposed at the bottom end of the right and left fixed masts 45 respectively. Therefore, by the use of the right and left fixed masts 45, the supporting leg body 132 can be supported with high rigidity in the vicinity of the road surface. That is to say, a structure to prevent the traveling body 1 from turning over can be simply configured with the supporting leg body 132 and the outrigger locking mechanism 137.

Figure 15:
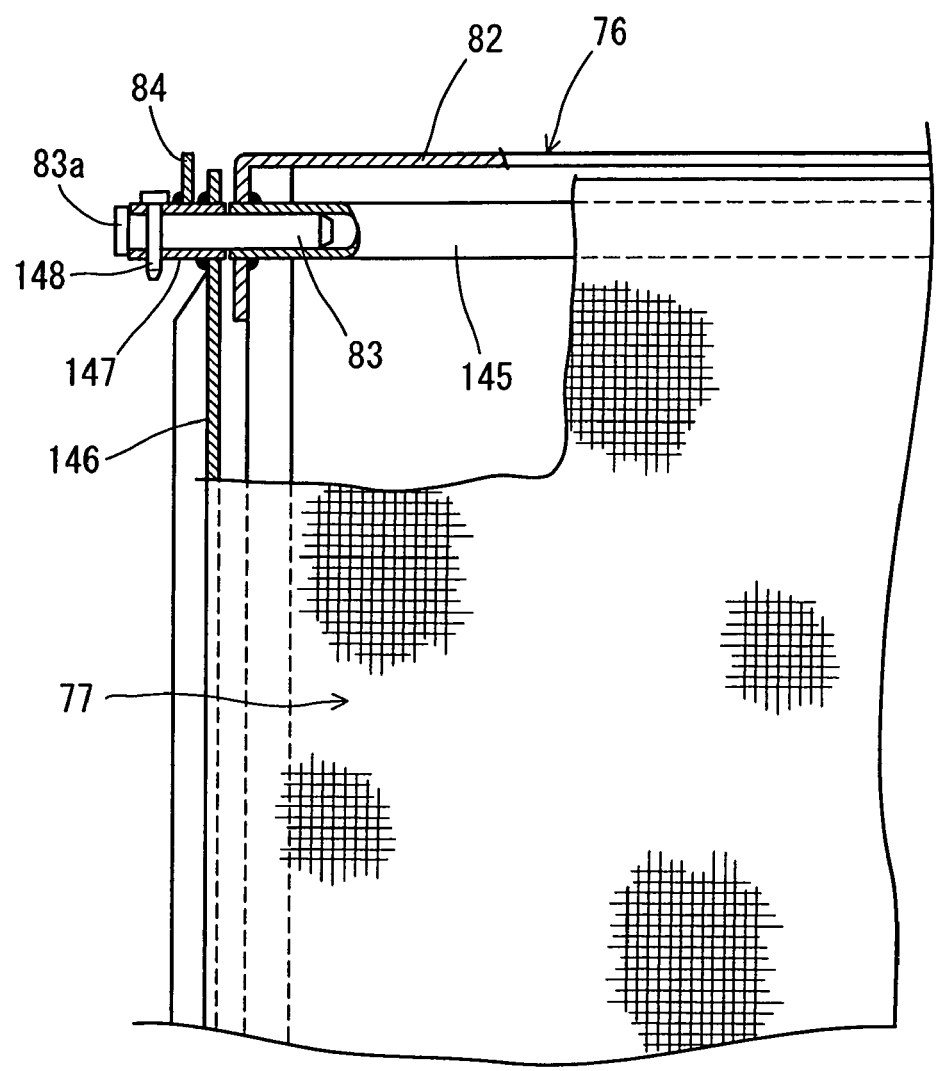
FIG. 15 is an enlarged view partially explaining a grass collection box.
Figure 16:
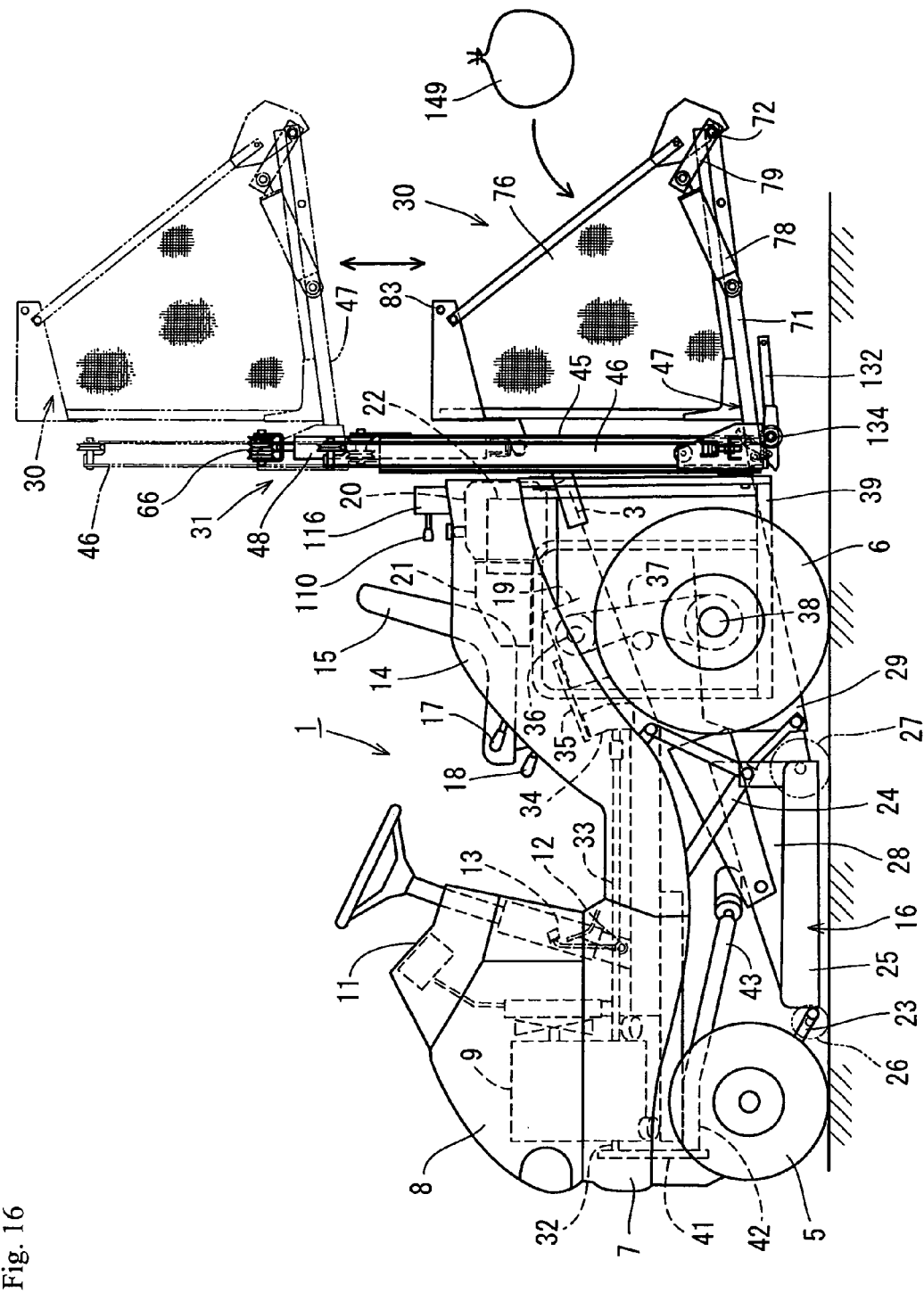
FIG. 16 is an overall side view showing another embodiment.

Next referring to FIG. 15 and FIG. 16, a structure of the grass collection box 30 of the present embodiment is described. As shown in FIG. 15, a cylinder opening/closing bearing body 145 is fixed to the top face frame 82 of the grass collection main body 76. A tube-shaped boss body 147 is welded to a frame 146 of the cover 77. One end of the opening/closing operation arm 84 is welded to the boss body 147. The boss body 147 is fitted to the pin-shaped opening/closing fulcrum shaft 83 having a head 83a. A retaining pin 148 is penetrated through the opening/closing fulcrum shaft 83 and the boss body 147. The top end of the opening/closing fulcrum shaft 83 is inserted in the opening at the end of the opening/closing bearing body 145. The right and left boss bodies 147 are respectively provided in the right and left rim frames 146 of the cover 77.

That is to say, when the cover 77 is incorporated with the grass collection main body 76 through the opening/closing bearing shaft 83, the right and left boss bodies 147 are penetrated insertably/extractably through the right and left opening/closing bearing shafts 83. At the same time, the top ends of the right and left opening/closing fulcrum shafts 83 are inserted in the openings of the right and left ends of the opening/closing bearing body 145 respectively. Next, the right and left opening/closing fulcrum shafts 83 are locked to the right and left boss bodies 147 by the right and left locking pin 148 respectively. The cover 77 is connected to the grass collection main body 76 through the opening/closing fulcrum shafts 83 openably and closably. That is to say, the cover 77 can be connected to the grass collection main body 76 without any tools.

On the other hand, when the cover 77 is removed from the grass collection main body 76, the engagement between the right and left boss bodies 147 and the right and left opening/closing fulcrum shafts 83 is released by pulling out the right and left retaining pins 148 without any tools. Subsequently without using any tools, the right and left opening/closing fulcrum shafts 83 are extracted from the openings at the ends of the right and left opening/closing bearing bodies 145. That is to say, the cover 77 can be removed from the grass collection main body 76 without using any tools.

In the above configuration, as shown in FIG. 16, for example, the grass collection main body 76 can be used for collecting dust 149 or cut grass and tree etc. in a state where the cover 77 is removed from the grass collection main body 76. That is to say, a big opening is formed in the rear face of the grass collection main body 76 by removing the cover 77 from the grass collection main body 76. From the opening in the rear face of the grass collection main body 76, the dust 149 or the pruned trees and plants, which are collected by the operator, can be thrown into the grass collection main body 76. On the other hand, when the grass collection main body 76 is full of the dust 149 or the trees and plants, the traveling body 1 moves to a place for dumping such as the container 90 and the loading space of a truck. And like as described above, the grass collection main body 76 can be lifted up by the operation of the lift cylinder 48, or be rotated backward by the operation of the dump cylinder 78. The dust 149 or the trees and plants in the grass collection main body 76 can be discharged to a dump place such as a container 90 or a back of a truck.

Figure 17:
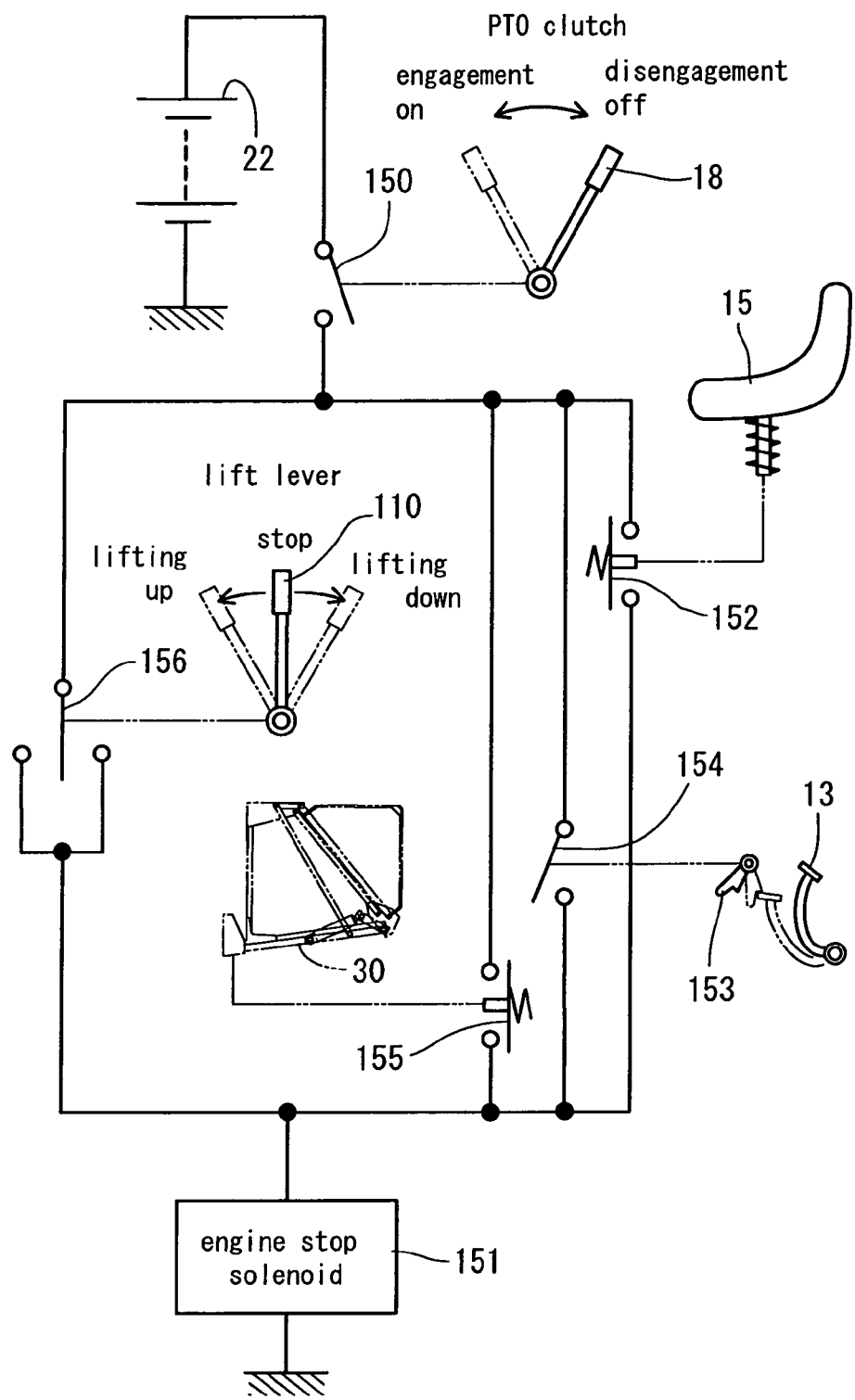
FIG. 17 is a diagram of a circuit used to stop an engine.

Next, referring to FIG. 17, in the lawn mower of the present embodiment, there will be described a control structure to automatically stop the engine 9 by a misoperation of the PTO clutch lever 18 by the operator. As shown in FIG. 17, a battery 22 for starting the engine 9 is provided. A PTO clutch engagement sensor 150 whose structure is an on-off switch type is provided. The PTO clutch engagement sensor 150 detects the PTO clutch engagement operation of the above described PTO clutch lever 18 (drive operation of the mower device 16). An engine stop solenoid 151 as an engine stop mechanism is provided. The PTO clutch engagement sensor 150 and the engine stop solenoid 151 are connected to the battery 22 in series. The supply of fuel from the fuel tank 20 to the engine 9 is stopped by the engine stop solenoid 151, and the engine 9 is also stopped.

As shown in FIG. 17, the operator sensor 152 whose structure is an on-off switch type is provided. When the operator sits on the above described driver seat 15, the operator sensor 152 is turned off. The PTO clutch engagement sensor 150 and the engine stop solenoid 151 are connected to the operator sensor 152 in series. Therefore, when no operator sits on the driver seat 15, the operator sensor 152 remains on. That is to say, when the operator sits on the driver seat 15, the operator sensor 152 turns off and the mower device 16 can be operated. On the other hand, when no operator sits on the driver seat 15, the operator sensor 152 turns on, and the mower device 16 cannot be operated. Also, the PTO clutch engagement sensor 150 turns on by a PTO clutch engagement operation of the PTO clutch lever 18. When the PTO clutch engagement sensor 150 turns on, the engine stop solenoid 151 is operated and stops the engine 9 automatically.

As shown in FIG. 17, the parking lever 153 and the parking brake sensor 154 whose structure is an on-off switch type are provided. By the parking lever 153, the above described brake pedal 13 is locked and held lockably and unlockably in a braking position (a step-on position of the brake pedal). When a locking operation of the brake pedal 13 by the parking lever 153 makes the parking brake turn on, the parking brake sensor 154 turns on. Also, the parking brake sensor 154 is connected to the PTO clutch engagement sensor 150 and the engine stop solenoid 151 in series. That is to say, the parking brake sensor 154 becomes on in a state where the brake pedal 13 is locked in the parking lever 153. Also, the engine 9 is stopped automatically by a PTO engagement operation of the PTO clutch lever 18. Accordingly, while the parking brake sensor 154 is remained on during the operation of the parking brake, the mower device 16 cannot be operated.

As shown in FIG. 17, the grass collection box lift-down sensor 155 whose structure is an on-off switch type is provided. When the grass collection box 30 described above is supported in a position for collecting grass (at a lift-down position) at the rear of the traveling body 1, the grass collection box lift-down sensor 155 turns on by the lift frame body 47. The grass collection box lifting down sensor 155 is connected to the PTO clutch engagement sensor 150 and the engine stop solenoid 151 in series. Accordingly, when the grass collection box 30 is not supported in a position for collecting grass at the rear of the traveling body 1, in other words, when the lift lever 110 is in operation, the grass collection box lifting down sensor 155 turns on, and the mower device 16 cannot be operated. On the other hand, when the grass collection box 30 is supported in a position for collecting grass (a mowing operation position) in the back of the traveling body 1, in other words, when the lift lever 110 is not in operation, the grass collection box lifting down sensor 155 turns off, and the mower device 16 can be operated.

As shown in FIG. 17, a lift lever operation sensor 156, which is activated by lift-up and lift-down operations of the lift lever 110 described above, is provided. The lift lever operation sensor 156 is connected to the PTO clutch engagement sensor 150 and the engine stop solenoid 151 in series. Accordingly, in a state where the PTO clutch lever 18 is operated to engage the PTO, for example, in a state where the mower device 16 is in operation when the lift lever 110 is operated for lifting up or down, the engine stop solenoid 151 is operated and the engine 9 is automatically stopped. Therefore, lifting up the grass collection box 30 caused by a misoperation of the lift lever 110, during the operation of the mower device 16, can be prevented. That is to say, it is possible to prevent mowed grass from being scattered from the opening at the rear end of the discharge duct 29 to the outside of the grass collection box 30.

Figure 20:
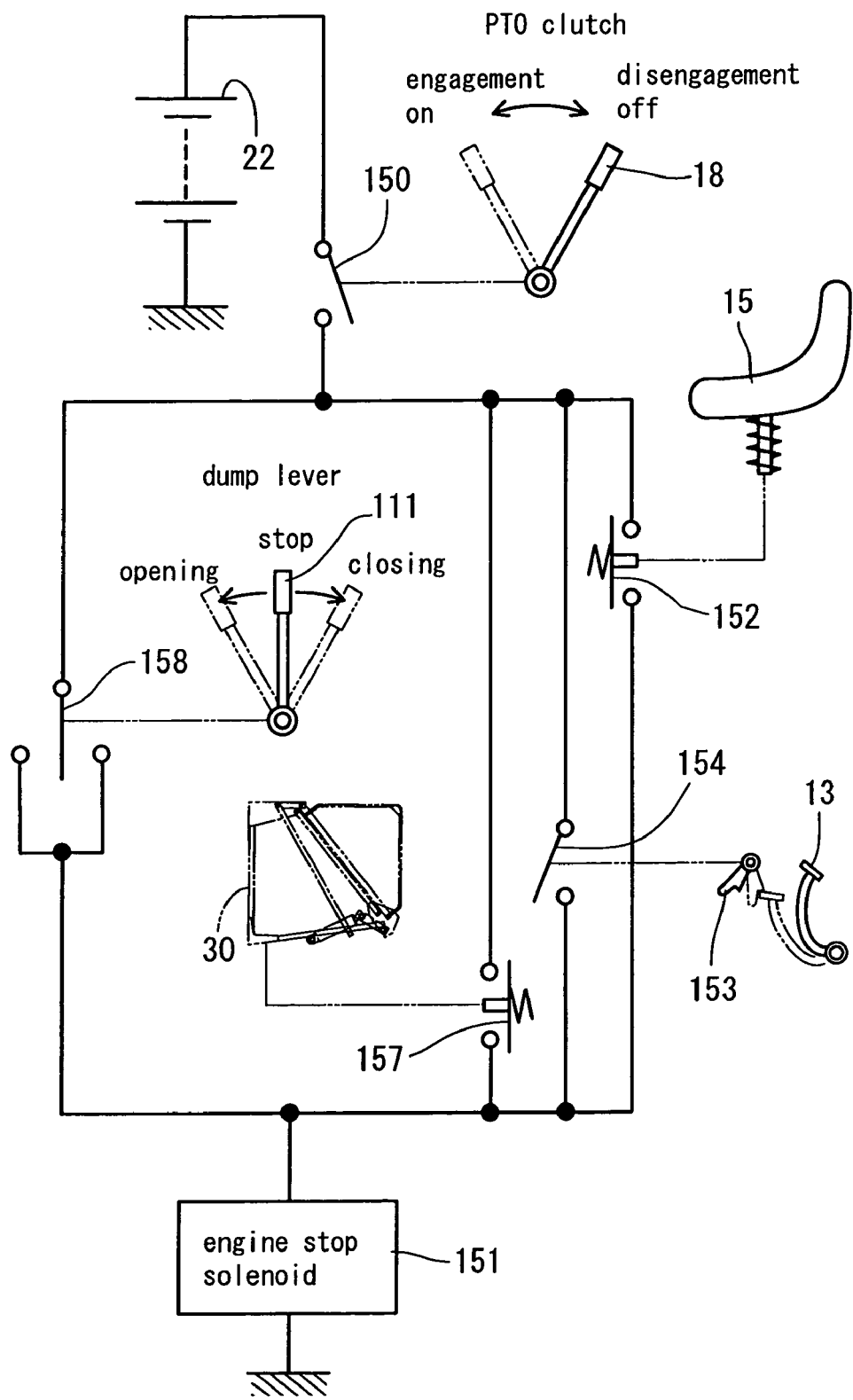
FIG. 20 is a control circuit diagram showing another embodiment of FIG. 17.

On the other hand, FIG. 20 shows the embodiment that the engine 9 is stopped by the operation of the dump lever 111 instead of the lift lever 110 in FIG. 17. As shown in FIG. 20, the grass collection box initial position sensor 157 whose structure is an on-off switch type is provided. When the grass collection box 30 described above is supported in an upward position for collecting grass (the cover 77 is in a closing position) above the lift frame body 47, the grass collection box initial position sensor 157 is turned off by the grass collection box 30. The grass collection box initial position sensor 157 is connected to the PTO clutch engagement sensor 150 and the engine stop solenoid 151 in series. Accordingly, when the grass collection box 30 is not supported in a position for collecting grass in the backward of the traveling body 1, for example, when the dump lever 111 is operated, the grass collection box initial position sensor 157 turns on. Therefore, the operation of the mower device 16 is prevented. That is to say, when the grass collection box 30 is supported in a position for collecting grass (a mowing operation position) above the lift frame body 47, in other words, when the dump lever 111 is not operated, the grass collection box initial position sensor 157 turns off, the mower device 16 can be operated.

Also, as shown in FIG. 20, a dump lever operation sensor 158, turned on by an opening or closing operation of the dump lever 111, which is described above, is provided. The dump lever operation sensor 158 is connected to the PTO clutch engagement sensor 150 and the engine stop solenoid 151 in series. Accordingly, when the mower device 16 is operated by a PTO engagement operation of the PTO clutch lever 18, the engine stop solenoid 151 is actuated by the opening or closing operation of the dump lever 111, and thus automatically stops the engine 9. That is to say, during the operation of the mower device 16, misoperation of the dump lever 111 stops the engine 9 automatically. Therefore, scattering mowed grass from the opening at the rear end of the discharge duct 29 to the outside of the grass collection box 30 can be prevented.

Figure 18:
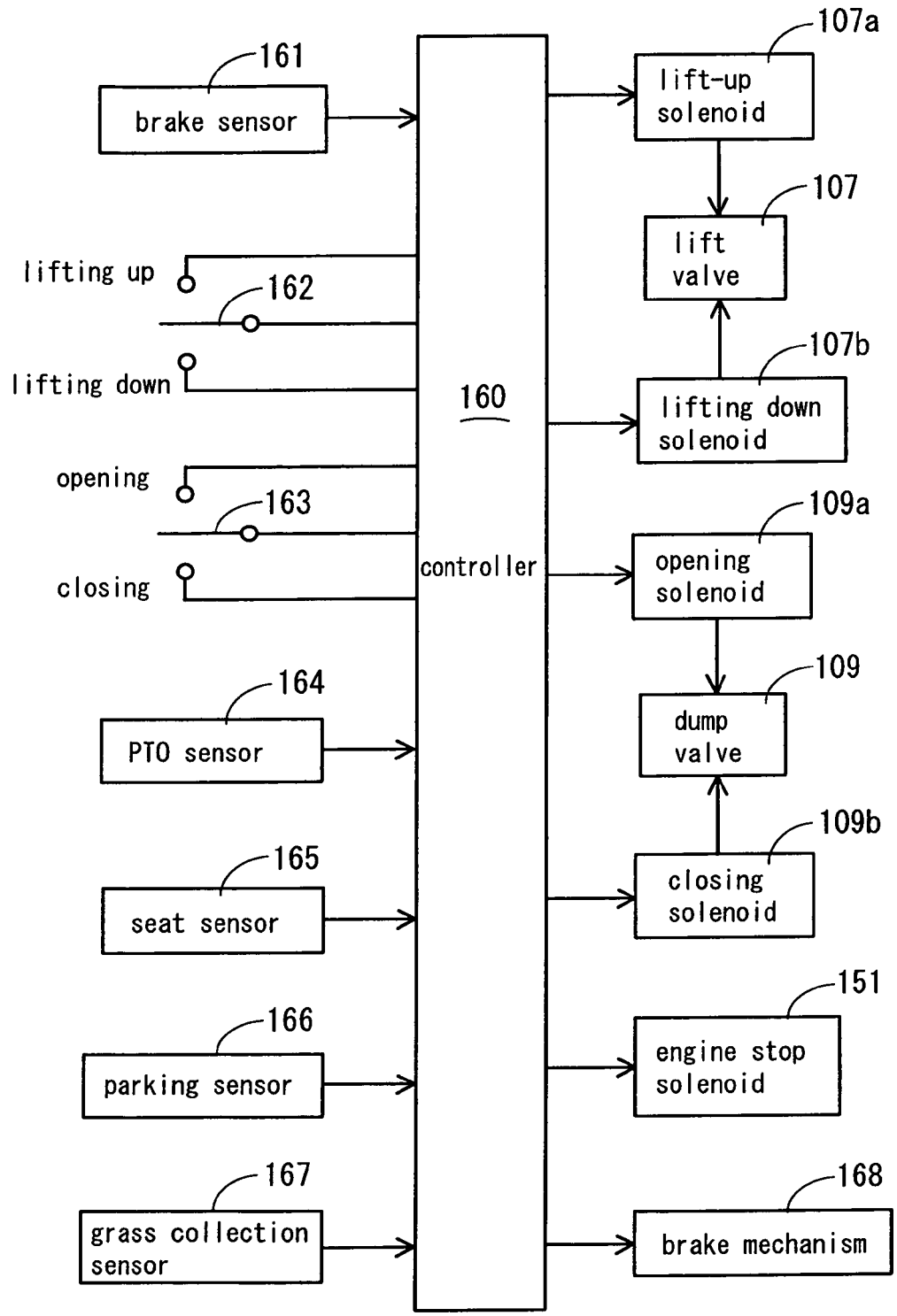
FIG. 18 is a functional block diagram of control means of a grass collection operation.

Next, a control of a grass collecting operation of the lawn mower in the present embodiment will be described. The control of the grass collecting operation includes a mowed grass discharge control and an engine stop control. FIG. 18 is a functional block diagram of a control means of the grass collection operation. As shown in FIG. 18, a controller 160 for grass collecting operation, such as a microcomputer, is provided. The controller 160 includes a ROM which stores a control program, and a RAM which stores various data. The controller 160 is connected to the battery 22 through a key switch for applying power.

As shown in FIG. 18, various sensors for an input system and switches are connected to the controller 160. That is to say, a brake sensor 161 of a limit switch type, which turns on when the operator steps on the brake pedal 13, is provided. A lift switch 162, which lifts up or down the lift cylinder 48, is provided. A dump switch 163, which opens or closes the dump cylinder 78, is provided. The brake sensor 161, the lift switch 162, and the dump switch 163 are connected to the controller 160. Also, a PTO sensor 164 of an on-off switch type, which detects PTO engagement operation (drive of the mower device 16) of the PTO clutch lever 18, is provided. A seat sensor 165 of on-off switch type, which is off operation when the operator sits on the seat 15, is provided. A parking sensor 166 of an on-off switch type, which is activated by the engaging operation (in a state where a parking brake is in operation) of the brake pedal 13 by the parking lever 153, is provided. The PTO sensor 164, the sheet sensor 165, and the parking sensor 166 are connected to the controller 160. In addition, a grass collection sensor 167 of an on-off switch type, which is activated when the grass collection box 30 is supported in a position for collecting mowed grass in the back of the traveling body 1, is provided. The grass collection sensor 167 is connected to the controller 160.

Furthermore, as shown in FIG. 18, various electromagnetic solenoids of an output system are connected to the controller 160. That is to say, a lift-up solenoid 107a and a lift-down solenoid 107b for a lift valve 107 of an electromagnetic switch type, which lift up or down the lift cylinder 48, are provided. An opening solenoid 109a and a closing solenoid 109b for a dump valve 109 of an electromagnetic switching-type, which open or close the dump cylinder 78, are provided. The engine stop solenoid 151 as an engine stop mechanism, which stops the engine 9 by canceling supply of fuel from the above-described fuel tank 20 to the engine 9, is provided. The lift-up solenoid 107a, the lift down solenoid 107b, the opening solenoid 109a, the closing solenoid 109b, and the engine stop solenoid 151 are connected to the controller 160.

Figure 19:
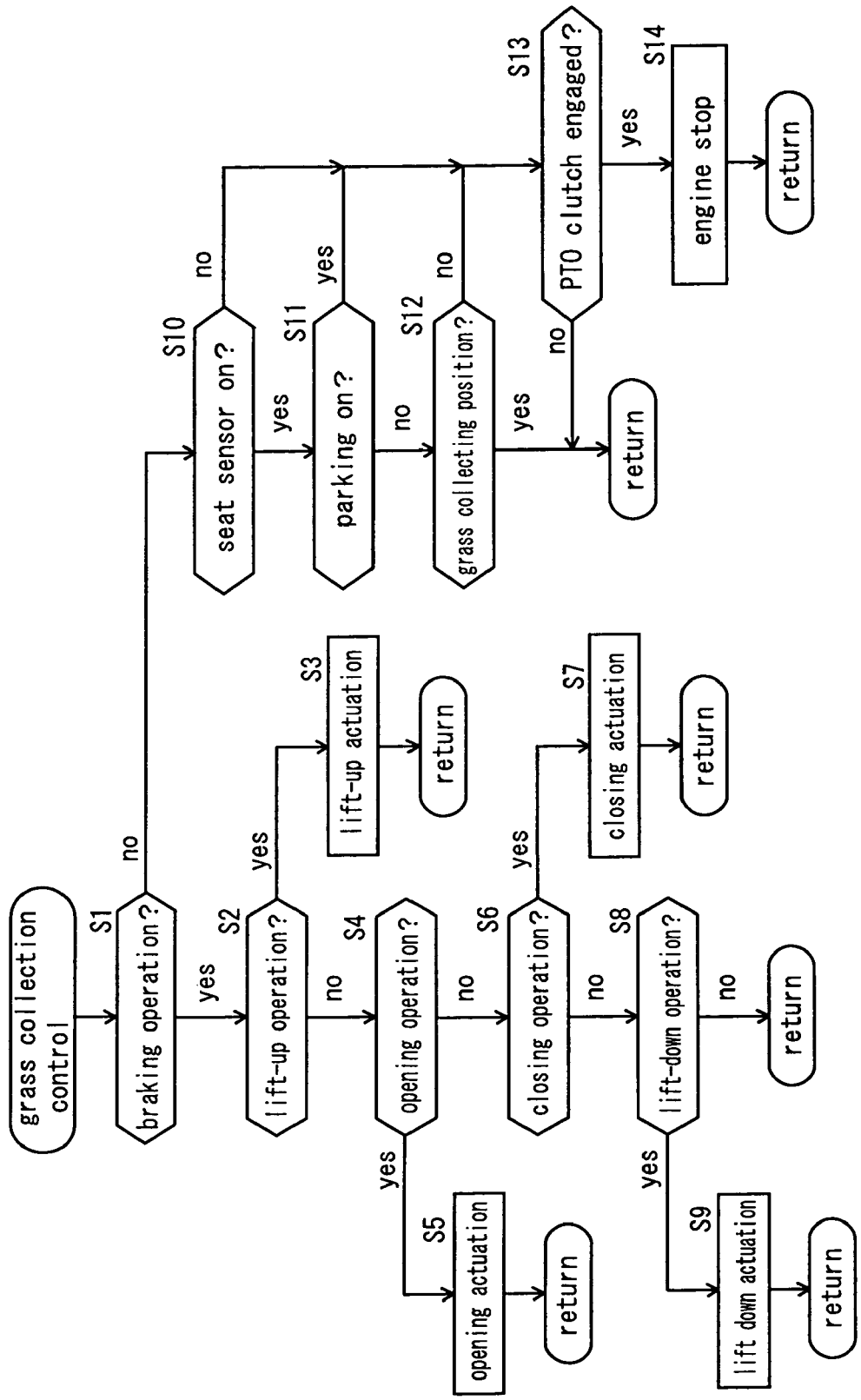
FIG. 19 is a flowchart of control of a grass collection operation.

Next, referring to a flow chart shown in FIG. 19, a discharge control of the mowed grass in the grass collection box 30 and a stop control of the engine 9 will be described. During the mowing operation of the grass etc. in the present embodiment, the operator determines whether the grass collection box 30 is full of the mowed grass 89. When the mowed grass 89 fills up the grass collection box 30, the operator moves the traveling body 1 to a discharging place of the mowed grass 89 where there is the container 90 or a loading space of a truck. When the mowed grass 89 in the grass collection box 30 is discharged into the container 90 etc., it is determined whether or not the operator steps on the brake pedal 13 based on the detected results of the brake sensor 161 (S1). When the operator steps on the brake pedal 13 (S1: yes), by a lift-up operation of the lift switch 162 by the operator (S2: yes), the lift cylinder 48 is actuated to lift up (S3). An opening operation of the dump switch 163 by the operator (S4: yes) actuates the dump cylinder 78 to open (S5). That is to say, the grass collection box 30 at a position for collecting the mowed grass at the rear of the traveling body 1 is lifted up to a position higher than the top face opening of the container 90 by the lift-up operation of the lift switch 162. While the grass collection main body 76 overturns backward by an opening operation of the dump switch 163, the cover 77 moves upward to the rear. Accordingly, the cover 77 opens, and mowed grass 89 in the grass collection box 30 is discharged into the approximately center of the top face opening of container 90.

The operator determines whether or not the mowed grass 89 is discharged from the grass collection box 30. When the mowed grass 89 is discharged, and the grass collection box 30 becomes empty, the closing operation of the dump switch 163 by the operator (S6: yes) actuates the dump cylinder 78 to close (S7). In addition, the lift-down operation of the lift switch 162 by the operator (S8: yes) actuates the lift cylinder 48 to lift down (S9). That is to say, when the discharge of the mowed grass 89 from the grass collection box 30 is completed by the closing operation of the dump switch 163, the cover 77 moves downward to the front to close while overturning of the grass collection main body 76 forwardly. Also, the lift-down operation of the lift switch 162 lifts down the grass collection box 30, which is in a higher position than the top face opening of the container 90, to a position for collecting grass at the rear of the traveling body 1. Accordingly, the mowing operation can be resumed by driving the mower device 16. By resuming the mowing operation, the mowed grass 89 is carried from the mower device 16 to the grass collection box 30 again, and the mowed grass 89 is collected in the grass collection box 30.

Accordingly, only when the operator steps on the brake pedal 13, the lift cylinder 48 is actuated by the operation of the lift switch 162, or the dump cylinder 78 is actuated by the operation of the dump switch 163. The lift cylinder 48 and the damp cylinder 78 do not operate concurrently, that is, one of them is prevented from operating while the other is in operation. For example. Even if both the lift switch 162 and the damp switch 163 are operated approximately at the same time by the operator, or even if either the lift switch 162 or the damp switch 163 is operated while the other has been operated, the lift cylinder 48 (or the dump cylinder 78) is actuated based on the operation of the lift switch 162 (or of the dump switch 163) which has been operated in advance. That is to say, while the lift cylinder 48 is operating, the dump cylinder 78 is not even with the wrong operation of the dump switch 163. Also, while the dump cylinder 78 is operating, the lift cylinder 48 is not actuated even with the wrong operation of the lift switch 162.

On the other hand, in the above steps, when the operator performs the PTO engagement operation of the PTO clutch lever 18 (S13: yes), the engine stop solenoid 151 is actuated, and the engine 9 is forcibly stopped (S14) under at least one of the following conditions: a state where the brake pedal 13 is not depressed by the operator (S1: no); a state where the operator is not seated on the seat 15, and thus the seat sensor 165 is off (S10: no); a state (a parking brake state) where the brake pedal 13 is locked in a brake actuating position by the parking lever 153 (S11: yes); or a state where the grass collection box 30 is not supported in a position for collecting grass at the rear of the traveling body 1 (S12: no).

That is to say, the mower device 16 is prevented from operating in the case that no operator sits on the driver seat 15, that the parking brake is on (the rear wheels are in a braked condition), or that the grass collection box 30 is supported in a position other than that for collecting grass at the rear of the traveling body 1.

Also, the brake mechanism 168 for braking the rear wheels 6 (or front wheels 5) is connected to the above-described controller 160. The brake mechanism 168 is comprised of an electric brake motor (not shown), or a hydraulic brake cylinder and an electromagnetic brake valve etc. When the lift cylinder 48 is actuated by the operation of the above described lift lever 110 or the lift switch 162, the brake mechanism 168 is configured to be actuated approximately concurrently with the operation of the above-described lift lever 110 or the lift switch 162. Therefore, the rear wheels 6 are braked automatically by the operation of the lift lever 110 or the lift switch 162. That is to say, when the lift cylinder 48 is operated to lift up and down the grass collection box 30, even if a foot of the operator moves away from the brake pedal 13, or the operator forgets to stepping on the brake pedal 13, braking of the rear wheels 6 prevents the traveling body 1 from moving. Accordingly, while the traveling body 1 is kept in an approximately constant place, the mowed grass 89 in the grass collection box 30 can be discharged into the container 90, etc.

As is apparent from the above description and FIGS. 11 to 13, after the supporting leg body 132 approaches (advances to) a landing direction by the lift-up operation of the grass collection box 30, an additional lift-up operation of the grass collection box 30 makes the outrigger locking mechanism 137 engage with the supporting leg body 132. Accordingly, while the supporting leg body 132 moves from a position for retracting that is apart from the landing surface G to a position for landing, it is possible to prevent the supporting leg body 132 from being locked by the outrigger locking mechanism 137. After the outrigger locking mechanism 137 locks the support leg body 132 in a landing position, the grass collection box 30 can be lifted up. Also, after the outrigger locking mechanism 137 is released from the supporting leg body 132 by the lift-down operation of the grass collection box 30, an additional lift-down operation of the grass collection box 30 makes the supporting leg body 132 move apart from (retract from) the landing surface G. Therefore, even if the grass collection box 30 is lifted down before unlocking the supporting body 132 in a landing position is unlocked, the supporting leg body 132 is not retracted in the direction separate from the landing surface G. That is to say, even if the supporting leg body 132 is retracted in association with the lift-down operation of the grass collection box 30, it is possible to prevent the supporting leg body 132, etc. from being damaged. Also, it can be prevented that the operator forgets to unlock the supporting leg body 132. The mowing operation for the grass 89, etc. can be resumed after certainly returning the supporting leg body 132 to a retracting position where the supporting leg body 132 is away from the landing surface G.

As is apparent from the above description and FIG. 3, FIG. 5, the lift cylinder 48 and the movable masts 46 are coupled to each other through the lift wires 58, 59 and the triple pulley 66 as a first double speed mechanism. The movable masts 46 and the lift frame bodies 47 are coupled to each other through the lift-up wires 74 and the lift-up pulleys 75 as a second double speed mechanism. The lift frame bodies 47 and the grass collection box 30 are lifted up and down with respect to the movable masts 46 by the up-and-down movement of the movable masts 46 with respect to the fixed masts 45 by the lift cylinder 48. Therefore, the elevation length of the movable masts 46 can simply be twice as long as that of the lift cylinder 48, and the elevation length of the lift frame 47 can simply be twice as long as that of the movable masts 46. That is to say, the elevation length (lifting length amount) of the grass collection box 30 (the lift frame body 47) can simply be four times as long as that of the lift cylinder 48. Therefore, even if the elevation length of the grass collection box 30 can be large and the grass collection box can be lifted up highly, the lift cylinder 48 is simply configured by, for example, an inexpensive short-stroke, light-weight hydraulic cylinder. When the grass collection box 30 is lifted down, the movable masts 46 can be retracted and lowered. That is to say, the height of the fixed masts 45 and the movable masts 46 can be compactly-supported at the rear of the traveling body 1 so as not to block the operator is view (backward view of the traveling body) when the traveling machine body 1 is driven backward.

As is apparent from the above description and FIG. 1, FIG. 9, and FIG. 12, the grass collection box 30 (grass collector) is supported to be lifted up and down through the lift cylinder 48 (lift drive means) to traveling body 1. The grass collection box 30 is rotatably supported through the dump cylinder 78 (dump drive means). The brake pedal 13 (brake operation body) braking the rear wheels 6 (traveling parts) of the traveling body 1, the lift lever 110 or the lift switch 162 (lifting operation body) operating the lift cylinder 48, and the dump lever 111 or dump switch 163 (rotating operation body) operating the dump cylinder 78 are provided. The locking arm body 120 or the controller 160 (permission control means), which permits the operation of the lift lever 110 (lift switch 162) and that of the dump lever 111 (dump switch 163) by detecting the braking operation of the brake pedal 13, are provided. Therefore, when the operator forcibly brake the rear wheels 6, the lift cylinder 48 or the dump cylinder 78 can be operated respectively. That is to say, during a mowing operation, even if the lift lever 110 (lift switch 162) or the dump lever 111 (dump switch 163) is wrongly operated, the wrong operation of the lift cylinder 48 or the dump cylinder 78 can be reduced. The mowed grass in the grass collection box 30 can be easily prevented from being discharged to a place other than a predetermined place.

As is apparent from the above description, d FIG. 9, and FIG. 12, the check arm body 121 or the controller 160 (check control means) is provided. The check arm body 121 or the controller 160 restricts the operation of either the lift lever 110 (lift switch 162) or the dump lever 111 (dump switch 163) by the operation of the other. Therefore, if the operator brakes the rear wheels forcibly, the lifting operation or rolling operation of the grass collection box 30 can selectively be performed. That is to say, in a state where the traveling body 1 is certainly stopped, the discharging operation of the mowed grass 89 in the grass collector 30 is performed according to the predetermined procedure, and thus the turnover of the lawn mower can simply be prevented. Accordingly, weight saving of the lawn mower can provide a reduction in manufacturing cost, and the increase in volume of the grass collector 30 can improve the operability of mowing.

As is apparent from the above description, FIG. 1, FIG. 17, FIG. 18, and FIG. 19, the engine stop solenoid 151 is provided as an engine stop mechanism for stopping the engine 9 mounted on the traveling body 1. The PTO clutch lever 18 as the PTO operation body for driving or stopping the mower device 16 is provided. In addition, the PTO clutch lever 18 for driving the mower device 16, the PTO clutch sensor 150 or the PTO sensor 164 as the PTO engagement detecting means for detecting the operation of the PTO clutch lever 18, the rear wheels 6 as the traveling part of the traveling body 1, the parking lever 153 as the parking brake holding the rear wheels 6 in a braked state, and the parking brake sensor 154 or the parking sensor 166 as the parking brake detecting means for detecting the operation of the parking brake 153 are provided. During the on-operation of the parking lever 153, by driving the mower device 16 of the PTO clutch lever 18, the engine stop solenoid 151 is operated. Therefore, the engine 9 can be stopped by the misoperation of the PTO clutch lever 18. That is to say, the improper driving of the mower device 16 due to the misoperation by the operator can simply be prevented. Drivability or operability of mowing by the operator can be improved.

The operator sensor 152 or the seat sensor 165 as the sitting detecting means for detecting that the operator sits on the driver seat 15 of the traveling body 1 is provided. The engine stop solenoid 151 is operated in at least one of the following cases: in the case that the parking lever 153 is on-operated during the operation of the mower device 16; and in the case that the operator leaves the driver seat 15. In addition, the grass collection box lift-down sensor 155 or the grass collection sensor 167 as the grass collection detecting means for detecting the grass collection box 30 supported in a position for collecting grass of the traveling body 1 is provided. In a state where the grass collection box 30 is supported at a position of the traveling body 1 other than the position for collecting grass, the engine stop solenoid 151 is operated by the drive operation of the mower device 16 of the PTO clutch lever 18. Also, the lift lever 110 or the lift switch 162 as a lift operation body for lifting up and down the grass collection box 30, and the lift lever operation sensor 156 or the controller 160 as the lift detecting means for detecting at least either or both of the lift-up operation and the lift-down operation of the lift lever 110 or the lift switch 162, are provided. During the driving of the mower device 16, the engine stop solenoid 151 is actuated by the lift-up or lift-down operation of the lift lever 110 or the lift switch 162.

As is apparent from the above description, FIG. 1, FIG. 3, and FIG. 5, the hydraulic lift cylinder 48 as the lift drive means having the piston rod 55 advancing upward is provided. The hydraulic lift cylinder 48 is disposed between the right and left fixed masts 45. Both the ends of the right and left lift wires 58, 59 as a mast traction body are connected with the traveling body 1 and the movable masts 46. The triple pulley 66 as the tip guide pulley is disposed at the top end of the piston rod 55. The right and left lift wires 58,59 are provided in a stretched state through the triple pulley 66. Both the ends of the lift-up wires 74 as the lift wire bodies are connected with the traveling body 1 and the lift frame body 47. The lift-up pulleys 75 as the movable guide pulley are disposed at the upper end of the movable mast 46. The lift-up wires 74 are provided in a stretched state through the lift-up pulleys 75. Accordingly, the lift frame body 47 can be lifted up toward the upper end of the movable mast 46 projecting from the upper end of the fixed mast 45. Therefore, when the mowed grass 89 is discharged, the grass collection box 30 can be lifted up to an extremely high position. On the other hand, the movable mast 46 and the lift frame body 47 can be lifted down within the height range of the fixed mast 45. Therefore, during the mowing operation, in which the grass collection box 30 is lowered, the overall body height can be lowered. Also, the hydraulic pressure structure of the lift mechanism 31 for lifting up and down the grass collection box 30 can simply be configured by providing a single hydraulic lift cylinder 48. It is not necessary to provide the right and left hydraulic cylinders in both right and left sides of the grass collection box 30 as in a conventional manner.

In the above embodiment, the right and left lift wires 58, 59 are provided as mast traction bodies, and the lift-up wire 74 is provided as a lift traction body. However, instead of the lift wires 58, 59 or the lift up wire 74, the mast traction body or the lift wire body may be made of chain. In the case of forming the lift wires 58, 59 or the lift-up wire 74 with chain, a triple sprocket instead of the triple pulley 66 as a tip guide wheel and a sprocket instead of lift up pulley 75 as movable guide wheels may be provided.

As is apparent from the above description, FIG. 3, FIG. 15, and FIG. 16, the grass collection box 30 is comprised of the grass collection main body 76 disposed in the lift mechanism 31 and the cover 77 disposed in the back of the grass collection main body 76 to be openable and closable. The bottom rear end of the grass collection main body 76 is coupled to the rear end of the lift frame 47 projecting backward from the movable mast 46 by the dump fulcrum shaft 72. The grass collection main body 76 is configured to rotate backward about the dump fulcrum shaft 72. On the other hand, the upper front end of the cover 77 is coupled to the upper rear end of the grass collection main body 76 through the opening/closing fulcrum shaft 83 with a pin structure which is detachable by a single operation. The cover 77 is configured to rotate upward to the rear about the opening/closing fulcrum shaft 83. Also, the cover 77 is configured to be removed from the grass collection main body 76 by removing the opening/closing fulcrum shaft 83 from the grass collection main body 76 coupled to the cover 77. Therefore, the cover 77 can easily be separated from the grass collection main body 76 only by removing the opening/closing fulcrum shaft 83 from the grass collection main body 76 without any tools. For example, the grass collection main body 76 separated from the cover 77 can easily be used for dust collection, etc. for dumping branches of trees and dust, etc. in the container 90 and the like.

The invention claimed is:
1. A lawn mower comprising:
   a mower device mounted on a traveling body having right and left traveling parts;
   a grass collector for collecting grass mowed by the mower device;
   a discharge duct for discharging the mowed grass from the mower device into the grass collector;
   a lift mechanism having right and left fixed masts for supporting the grass collector and connecting same to the traveling body to be lifted up and down;
   the lift mechanism being configured to lift up the grass collector and discharge the mowed grass in the grass collector;
   wherein the lift mechanism is disposed within a width dimension of the grass collector grass collector, the discharge duct being disposed between the right and left fixed masts, and the grass collector being connected to the discharge duct in a position between the right and left fixed masts;

the lift mechanism having right and left movable masts supported by the right and left fixed masts to be lifted up and down, a lift frame disposed to the movable masts to be lifted up and down, and a lift drive means for raising and lowering the lift frame body;

the lift drive means is disposed on a base frame coupled to the right and left fixed masts above the discharge duct;

the lawn mower further comprising a supporting leg body movable between a landed and unlanded position, the supporting leg body approaching the landed position by its own weight and supporting the grass collector during upward movement of the grass collector to a position for discharging the mowed grass and moving away from the ground to an unlanded position by downward movement of the grass collector by action of the lift drive means to a position for collecting the grass; and a locking mechanism that locks the supporting leg body in the landed position by the upward movement of the grass collector by the lift drive means to the position for discharging the mowed grass, and returns the supporting leg body to an accommodation position that is higher than the lower end of the fixed masts by downward movement of the grass collector to a position for collecting the grass by the lift drive means;

wherein the supporting leg body and the locking mechanism are disposed at the bottom ends of the right and left fixed masts.

2. The lawn mower according to claim 1, wherein the locking mechanism is configured to lock the supporting leg body by further upward movement of the grass collector by the lift drive means after the supporting leg body approaches a landing direction by the upward movement of the grass collector by the lift drive means, and the lock mechanism is configured to separate the supporting leg body from the ground it contacts in the landed position by further downward movement of the grass collector by the lift drive means after the locking mechanism is removed from the supporting leg body by the downward movement of the grass collector by the lift drive means.

* * * * *